United States Patent
Chatani

(10) Patent No.: US 6,567,845 B1
(45) Date of Patent: May 20, 2003

(54) SYSTEM FOR AND METHOD OF PROCESSING DATA, AND APPARATUS AND METHOD OF SENDING AND RECEIVING DATA

(75) Inventor: Masayuki Chatani, Tokyo (JP)

(73) Assignee: Sony Computer Entertainment, Inc., Tokyo (JP)

( * ) Notice: Subject to any disclaimer, the term of this patent is extended or adjusted under 35 U.S.C. 154(b) by 0 days.

(21) Appl. No.: 09/363,569

(22) Filed: Jul. 29, 1999

(30) Foreign Application Priority Data

Jul. 31, 1998 (JP) .......................................... 10-218299

(51) Int. Cl.[7] .............................................. G06F 15/16
(52) U.S. Cl. ...................... 709/208; 709/205; 709/213; 709/217; 463/39; 463/43
(58) Field of Search .................. 709/200, 204–205, 709/208–211, 213, 217, 246; 463/36–43

(56) References Cited

U.S. PATENT DOCUMENTS

| | | | | |
|---|---|---|---|---|
| 5,537,548 A | * | 7/1996 | Fin et al. ..................... | 709/208 |
| 5,630,757 A | * | 5/1997 | Gagin et al. .................. | 463/43 |
| 5,675,524 A | | 10/1997 | Bernard ....................... | 708/109 |
| 5,685,775 A | * | 11/1997 | Bakoglu et al. ............... | 463/41 |
| 6,195,687 B1 | * | 2/2001 | Greaves et al. ............... | 709/208 |
| 6,287,202 B1 | * | 9/2001 | Pascal et al. ................. | 463/42 |

FOREIGN PATENT DOCUMENTS

| | | | |
|---|---|---|---|
| EP | 0 976 429 | 2/2000 | ............ G06F/15/02 |
| EP | 0 976 431 | 2/2000 | ............ G06F/15/02 |
| GB | 2 310 298 | 8/1997 | ............ G06F/9/445 |
| GB | 2 325 593 | 11/1998 | ............ H04Q/7/32 |
| WO | WO 93/22713 | 11/1993 | ............ G05B/19/04 |
| WO | WO 95 12168 | 5/1995 | ............ G06F/15/16 |

OTHER PUBLICATIONS

"Sony to Develop "Personal Digital Assistant"", PSG News, Feb. 23, 1998, pp. 1–1, XP002120248, Retrieved from the Internet.

* cited by examiner

Primary Examiner—Bharat Barot
(74) Attorney, Agent, or Firm—Frommer Lawrence & Haug LLP; William S. Frommer; Hans R. Mahr

(57) ABSTRACT

Data are sent and received between a video game machine as a data processing apparatus with no radio communication function and an external device with a radio communication function. A portable computer is removably connected to the video game machine which processes data. A communication application and a radio communication driver for enabling radio communications between the portable computer and the external device are supplied from the video game machine to the portable computer, and stored into a memory of the portable computer. The portable computer supplied with the communication application and the radio communication driver enables the video game machine and the external device to send and receive data therebetween via the portable computer.

19 Claims, 22 Drawing Sheets

FIG. 26
441

CONTROL ITEMS

APPARATUS CONNECTION INTERFACE

MEMORY INTERFACE

DISPLAY INTERFACE

CONTROL INPUT INTERFACE

SOUND INTERFACE

WIRELESS COMMUNICATION INTERFACE

CLOCK MANAGEMENT INTERFACE

PROGRAM DOWNLOAD INTERFACE

SYSTEM FOR AND METHOD OF PROCESSING DATA, AND APPARATUS AND METHOD OF SENDING AND RECEIVING DATA

BACKGROUND OF THE INVENTION

1. Field of the Invention

The present invention relates to a system for and a method of processing data to send data to and receive data from an external device, and an apparatus for and a method of sending and receiving data, and more particularly to a system for and a method of processing data and an apparatus for and a method of sending and receiving data, which are preferably applicable to a system using a video game machine and a portable information communication terminal.

2. Description of the Related Art

Conventional video game machines such as video game apparatus for home use operate by running an application program in a video game machine unit based on game data recorded in a recording medium or an auxiliary memory to play a video game such as a competition game, for example, according to instructions entered by the game player via a manual controller. Such video game machines are finding widespread use at home.

Many video game machines generally have an excellent data processing capability for processing image and audio data so that the game player or user can experience complex and realistic images and sounds. Specifically, the data processing capability of conventional video game machines makes it possible to display complex game characters and produce realistic sounds for the video game, and can provide more sophisticated images and sounds than those produced by existing computers.

Though the conventional video game machines have the excellent data processing capability, however, they remain an apparatus for executing an application program to play a video game.

There have heretofore been proposed systems of interconnected master and slave units for sending and receiving data therebetween. The data sent and received between the master and slave units are merely ordinary image and sound data. It has not been attempted to supply an application program to be executed by the slave unit from a recording medium that belongs to the master unit.

SUMMARY OF THE INVENTION

It is therefore an object of the present invention to provide a system for and a method of processing data and an apparatus for and a method of sending and receiving data, which are capable of sending and receiving data between a master unit and an external device via a slave unit.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 26 is a diagram showing control items controlled by a control means in the portable electronic device.

DESCRIPTION OF THE PREFERRED EMBODIMENTS

A first embodiment of the present invention will be described below with reference to FIGS. 1 through 12. According to the first embodiment, the principles of the present invention are applied to a data processing system 1 capable of sending data to and receiving data from an external device 4 with a radio function.

Figure 1:
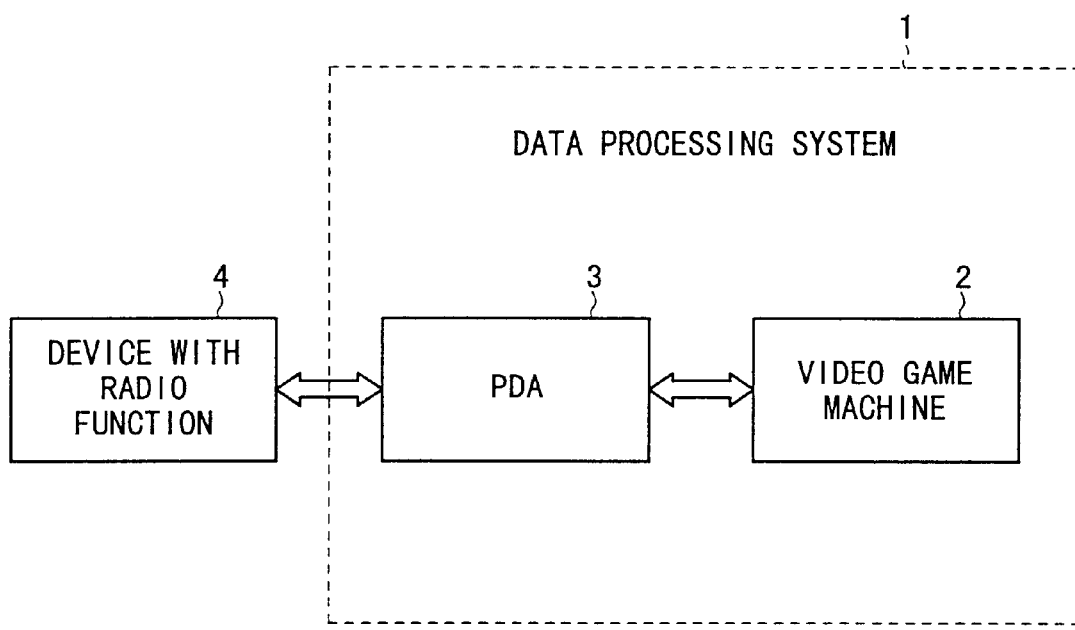
FIG. 1 is a block diagram of a data processing system according to a first embodiment of the present invention and a device with a radio function.

As shown in FIG. 1, the data processing system 1 comprises a video game machine 2 serving as a master unit for processing data, i.e., a data processing unit, and a portable computer 3 serving as a slave unit. The portable computer 3 is detachably inserted in the video game machine 2. The video game machine 2 is constructed as a video entertainment system which executes program data recorded in a recording medium (not shown) to play a video game or the like. The portable computer 3 is constructed as a PDA (Personal Digital Assistant) having a radio communication function.

Figure 2:
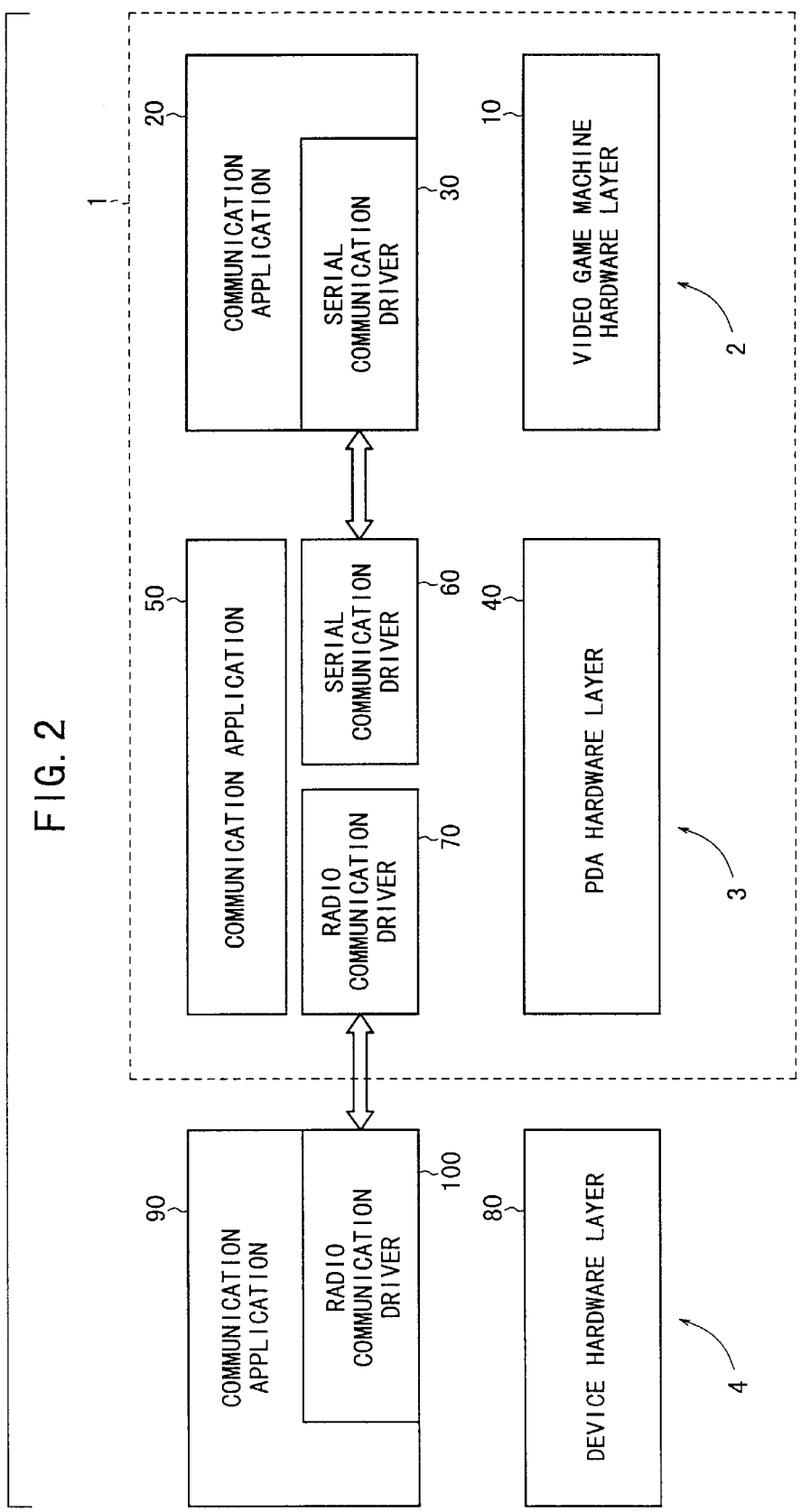
FIG. 2 is a block diagram of a hardware layer and a software layer of the data processing system and the device with the radio function.

The data processing system 1 is arranged as shown in FIG. 2 and communicates with the device 4 with the radio function. In the data processing system 1, the video game machine 2 comprises a video game machine hardware layer 10 and a software layer for controlling the video game machine hardware layer 10 and performing communications with the portable computer 3, the software layer comprising a communication application 20 and a serial communication driver 30 included in the communication application 20.

The portable computer 3 comprises a PDA hardware layer 40 and a software layer for performing a communication process in the PDA hardware layer 40, the software layer comprising a communication application 50, a serial communication driver 60, and a radio communication driver 70.

The device 4 with the radio function, which sends data to and receives data from the data processing system 1 via radio communications, comprises a device hardware layer 80 and a software layer for performing a communication process in the device hardware layer 80, the software layer comprising a communication application 90 and a radio communication driver 100 included in the communication application 90.

In the present invention, the wording "radio communication(s)" is defined to mean wireless communication(s) in the frequency range from around 20 Hz to 800 THz (terahertz), i.e., the frequency range from audio frequency to visible light frequency, including radio frequency and infrared frequency.

Figure 3:
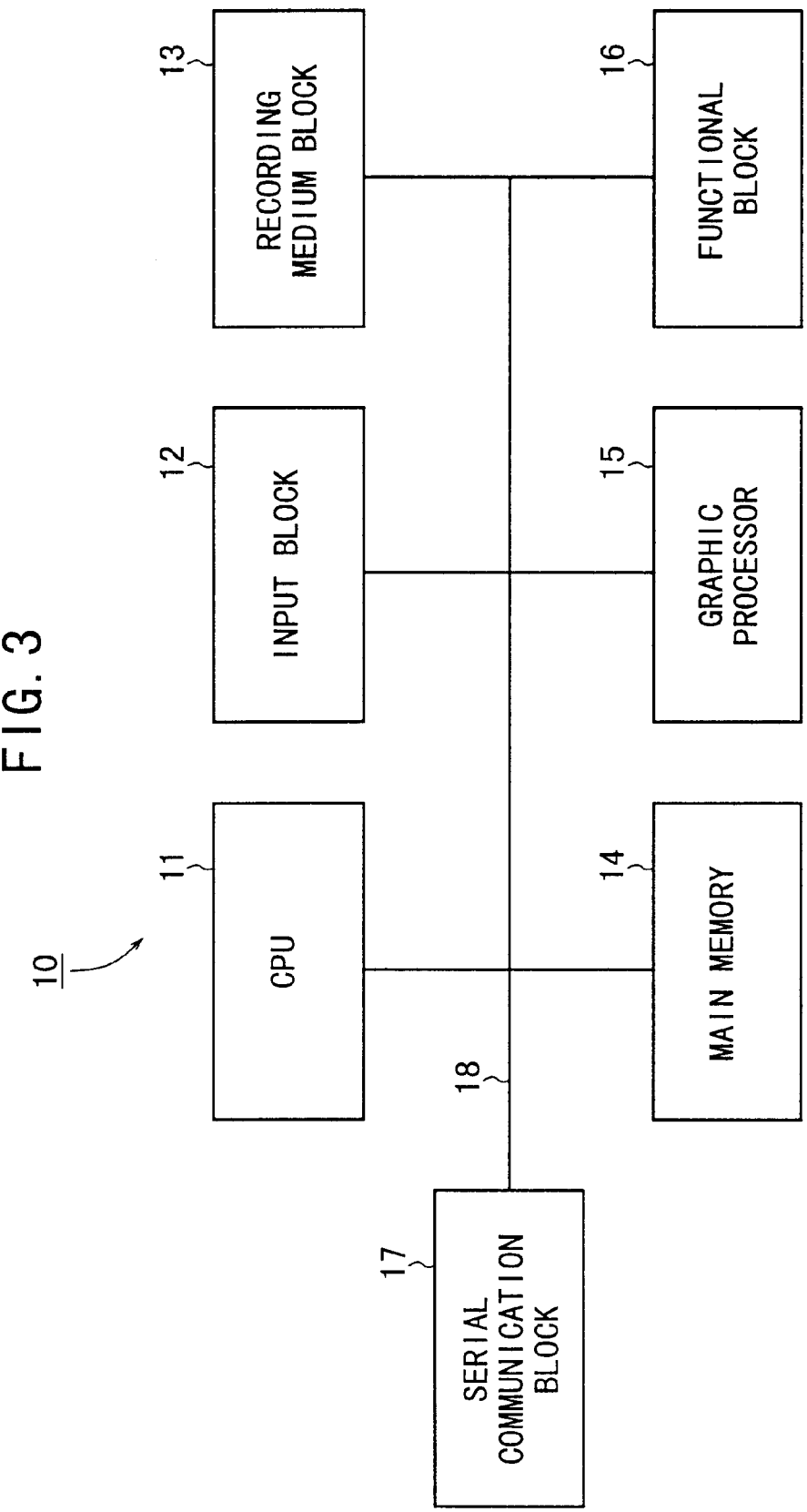
FIG. 3 is a block diagram of a video game machine of the data processing system.

As shown in FIG. 3, the video game machine hardware layer 10 comprises a CPU 11 functioning as a data supply means for acquiring and supplying data, an input block 12, a recording medium block 13, a main memory 14, a graphic processor 15, a functional block 16, and a serial communication block 17. These components of the video game machine hardware layer 10 are connected to a bus 18.

Figure 4:
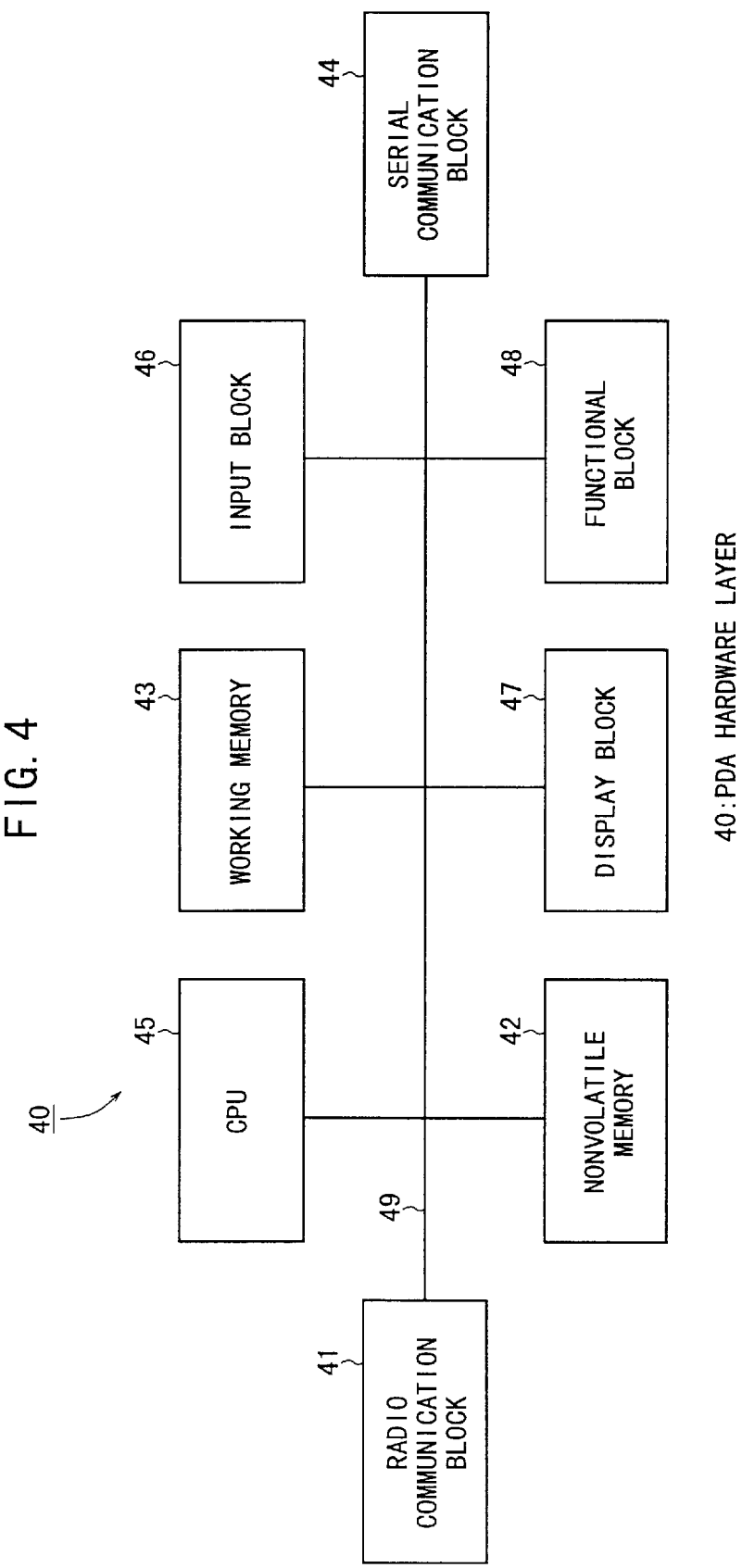
FIG. 4 is a block diagram of a portable computer of the data processing system.

As shown in FIG. 4, the PDA hardware layer 40 comprises a radio communication block 41 as a communication means for sending data to and receiving data from the device 4 with the radio function, a nonvolatile memory 42 and a working memory 43 both as a memory means for storing entered data, a serial communication block 44, a CPU 45, an input block 46, a display block 47, and a functional block 48. These components of the PDA hardware layer 40 are connected to a bus 49.

The input block 12 of the video game machine hardware layer 10 is arranged to function as a manual input controller. Therefore, the input block 12 allows the user to enter various items of information into the video game machine 2. The input block 12 also allows data to be processed in the video game machine 2 according to a control input action entered by the user.

The recording medium block 13 serves as a block for reading various data recorded in a recording medium or the like (not shown). For example, the recording medium comprises a CD-ROM or the like. The recording medium block 13 is controlled by the CPU 11 to read data from the recording medium which stores communication means control programs including communication applications and drivers that enable the portable computer 3 and the device 4 with the radio function to communicate with each other via a radio link. Specifically, the recording medium block 13 reads data from the recording medium which stores the communication application 50 and the radio communication driver 70 shown in FIG. 2.

The main memory 14 is a memory for storing various data. For example, the main memory 14 stores the communication application 20 as the software layer of the video game machine 2. The main memory 14 also stores data sent from the portable computer 3 via the serial communication block 17.

The graphic processor 15 serves as a processor for effecting image processing on entered data. Specifically, the graphic processor 15 effects graphic processing on images to be displayed on a display unit (not shown). More specifically, the graphic processor 15 performs a polygon graphic processing process.

The functional block 16 is arranged to perform other functions than the above blocks, and may comprise, for example, a power supply block (not shown) and a connection block for connection and a nonvolatile memory card system as a recording medium.

The serial communication block 17 has a function to effect serial communications with an external device. The serial communication block 17 has terminals (not shown) electrically connectable to the serial communication block 44 of the portable computer 3, for example. The video game machine 2 can thus send data to and receive data from the portable computer 3. The serial communication block 17 sends and receives data according to the serial communication driver 30 shown in FIG. 2.

The CPU 11 has a function to control the above blocks of the video game machine hardware layer 10. For example, the CPU 11 holds the communication application 50 and the radio communication driver 70 recorded in the recording medium in the main memory 14 of the video game machine 2, controls the communication application 50 and the radio communication driver 70 when they are supplied to the portable computer 3, and controls data inputted to and outputted from the portable computer 3. The CPU 11 also has a function to process and edit data. Furthermore, the CPU 11 controls the blocks according to programs of the software layer.

The video game machine 2 thus constructed is capable of playing a video game based on a program recorded in the recording medium such as a CD-ROM or the like. The video game machine 2 allows the nonvolatile memory card system to be removably connected thereto.

The radio communication block 41 of the PDA hardware layer 40 shown in FIG. 4 receives data sent from the device 4 with the radio function by way of infrared rays according to IrDA standards or microwaves. The radio communication block 41 also sends data entered from the video game machine 2 to the device 4 with the radio function. At this time, the radio communication block 41 sends and receives data according to the radio communication driver 70 shown in FIG. 2. Specifically, when the portable computer 3 sends data to and receives data from the device 4 with the radio function, the radio communication block 41 is controlled by the radio communication driver 70, and a radio communication block (not shown) in the device 4 with the radio function is controlled by the radio communication driver 100.

The nonvolatile memory 42 is a memory for storing various data. The nonvolatile memory 42 stores a communication device driver supplied from the video game machine 2 for performing communications with the device 4 with the radio function. Specifically, the nonvolatile memory 42 stores the communication application 50 and the radio communication driver 70 shown in FIG. 2. The nonvolatile memory 42 also stores data received from the device 4 with the radio function and data entered from the video game machine 2 via the serial communication block 44.

The working memory 43 is a memory for use as a work storage area for storing various data. As with the nonvolatile memory 42, the working memory 43 stores the communication application 50 and the radio communication driver 70, and also stores data received from the device 4 with the radio function and data entered from the video game machine 2 via the serial communication block 44.

The serial communication block 44 has a function to perform serial communications with an external device. For example, the serial communication block 44 is electrically connectable to the serial communication block 17 of the video game machine 2 for performing data communications with the video game machine 2. The serial communication block 44 sends and receives data according to the serial communication driver 60 shown in FIG. 2. The portable computer 3 is supplied, via the serial communication block 44, with a communication device driver and a communication application for use with the device 4 with the radio function, which are recorded in a recording medium (not shown) loaded in the video game machine 2, i.e., the communication application 50 and the radio communication driver 70.

The input block 46 is arranged to function as a manual control input unit (manual control input means). For example, the input block 46 allows the user to enter various items of information. When the portable computer 3 is not connected to the video game machine 2, the device 4 with the radio function can be operated according to a control input action entered via the input block 46.

The display block 47 is arranged to function as a display unit for displaying various items of information. The display block 47 displays various character information and image information on a liquid crystal panel (not shown), for example.

The functional block 48 is arranged to perform other functions than the above blocks, and may comprise, for example, a power supply block (not shown).

The CPU 45 has a function to control the above blocks. For example, the CPU 45 controls the blocks according to various programs of the above software layer.

The portable computer 3 receives data sent from the device 4 with the radio function. The portable computer 3 can removably be connected to the video game machine 2 for sending data to and receiving data from the video game machine 2. Furthermore, the portable computer 3 is compatible with the nonvolatile memory card system (not shown) that can also removably be connected to the video game machine 2.

Figure 5:
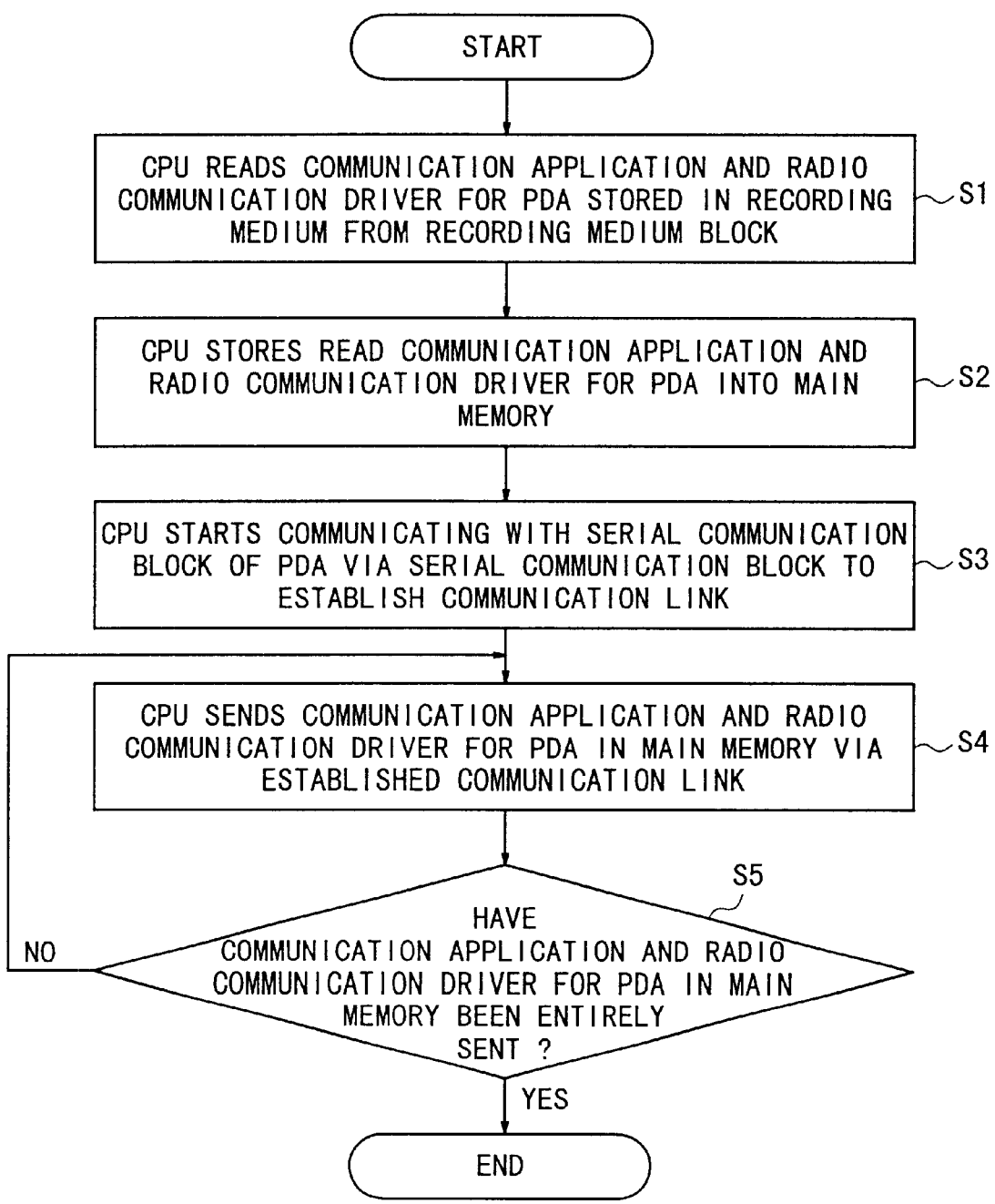
FIG. 5 is a flowchart of a processing sequence of the video game machine in a process of supplying a communication application and a radio communication driver from the video game machine to the portable computer.
Figure 6:
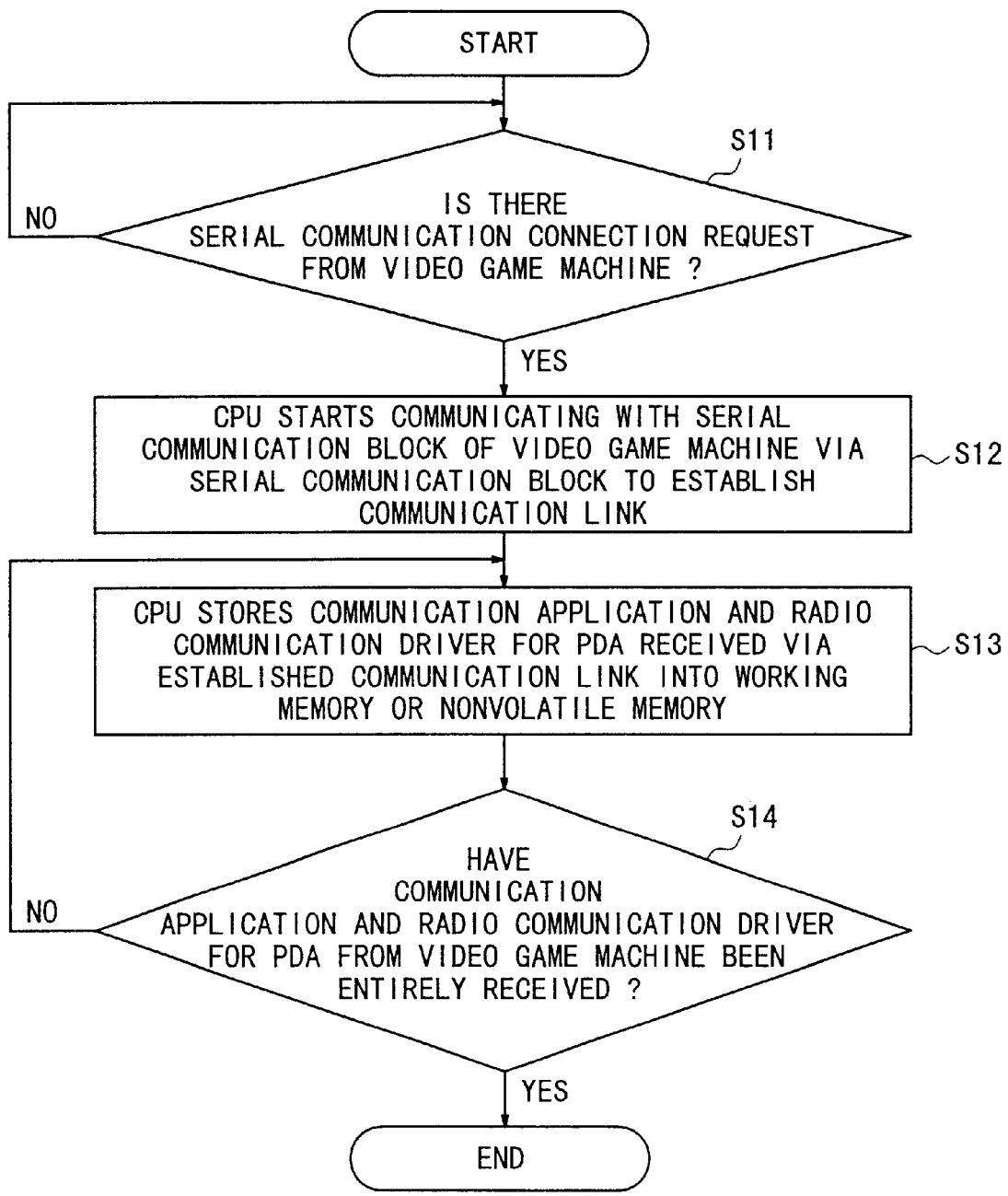
FIG. 6 is a flowchart of a processing sequence of the portable computer in the process of supplying a communication application and a radio communication driver from the video game machine to the portable computer.

In the data processing system 1, the video game machine 2 supplies the portable computer 3 with a program such as the communication program 50 which enables the portable computer 3 to perform radio communications with the device 4 with the radio function according to processing sequences shown in FIGS. 5 and 6.

As shown in FIG. 5, the CPU 11 of the video game machine 2 reads the communication application 50 and the radio communication driver 70 for use with the portable computer (PDA) 3 which are stored in a recording medium such as a CD-ROM or the like, for example, from the recording medium block 13 in step S1.

Then, the CPU 11 stores the communication application 50 and the radio communication driver 70 thus read in the main memory 14 in step S2.

The CPU 11 starts communicating with the serial communication block 44 of the portable computer 3 via the serial communication block 17 to establish a communication link therewith in step S3. Thereafter, the CPU 11 sends the communication application 50 and the radio communication driver 70 stored in the main memory 14 to the portable computer 3 via the established communication link.

To confirm the end of the transmission of the communication application 50 and the radio communication driver 70, the CPU 11 decides whether the communication application 50 and the radio communication driver 70 stored in the main memory 14 have entirely been sent or not in step S5. If the CPU 11 confirms that the communication application 50 and the radio communication driver 70 stored in the main memory 14 have entirely been sent, then the video game machine 2 finishes the process of sending the communication application 50 and the radio communication driver 70. If the CPU 11 confirms that the communication application 50 and the radio communication driver 70 stored in the main memory 14 have not entirely been sent, then the video game machine 2 executes the processing from step S4 again.

Concurrent with the above process carried out by the video game machine 2, the portable computer 3 decides whether there is a serial communication connection request from the video game machine 2 or not in step S11 shown in FIG. 6.

If the portable computer 3 confirms that there is a serial communication connection request from the video game machine 2 in step S11, then the CPU 45 of the portable computer 3 starts communicating with the serial communication block 17 of the video game machine 2 via the serial communication block 44 to establish a communication link therewith in step S12.

Then, the CPU 45 stores the communication application 50 and the radio communication driver 70 which have been received from the video game machine 2 via the established communication link into the working memory 43 or the nonvolatile memory 42 in step S13.

The processing in steps S12, S13 performed by the portable computer 3 corresponds to the processing in steps S3, S4 performed by the video game machine 2.

To confirm the end of the transmission of the communication application 50 and the radio communication driver 70, the CPU 45 decides whether the communication application 50 and the radio communication driver 70 have entirely been received from the video game machine 2 or not in step S14. If the CPU 45 confirms that the communication application 50 and the radio communication driver 70 have entirely been received from the video game machine 2, then the portable computer 3 finishes the process of receiving the communication application 50 and the radio communication driver 70. If the CPU 45 confirms that the communication application 50 and the radio communication driver 70 have not entirely been received, then the portable computer 3 executes the processing from step S13 again.

In the data processing system 1, the above processing sequences of the video game machine 2 and the portable computer 3 allow the video game machine 2 to supply the portable computer 3 with the communication application 50 and the radio communication driver 70 for use with the portable computer 3 for thereby enabling the portable computer 3 to perform radio communications with the device 4 with the radio function.

A process of sending data from the device 4 with the radio function to the video game machine 2 will be described below with reference to FIGS. 7 and 8.

The portable computer 3 runs the communication application 50 and the radio communication driver 70 supplied from the video game machine 2 to be able to perform radio communications with the external device 4 with the radio function. In step S21 shown in FIG. 7, the portable computer 3 decides whether there is a data reception request from the external device 4 with the radio function or not.

If the portable computer 3 confirms that there is a data reception request from the external device 4 with the radio function in step S21, then the CPU 45 of the portable computer 3 starts communicating with the radio communication block (not shown) of the device 4 with the radio function via the radio communication block 41 to establish a communication link therewith in step S22.

Then, the CPU 45 starts communicating with the serial communication block 17 of the video game machine 2 via the serial communication block 44 to establish a communication link therewith in step S23.

The CPU 45 stores data which have been received from the device 4 with the radio function via the established communication link therewith into the working memory 43 or the nonvolatile memory 42 in step S24.

The CPU 45 then sends the data stored in the working memory 43 or the nonvolatile memory 42 to the video game machine 2 via the established communication link with the video game machine 2 in step S25.

To confirm the end of the reception of the data from the external device 4 with the radio function, the CPU 45 decides whether the data from the external device 4 with the radio function have entirely been received or not in step S26. If the CPU 45 confirms that the data from the external device 4 with the radio function have entirely been received, then the portable computer 3 finishes the process of receiving the data. If the CPU 45 confirms that the data from the external device 4 with the radio function have not entirely been received, then the portable computer 3 executes the processing from step S24 again.

Figure 8:
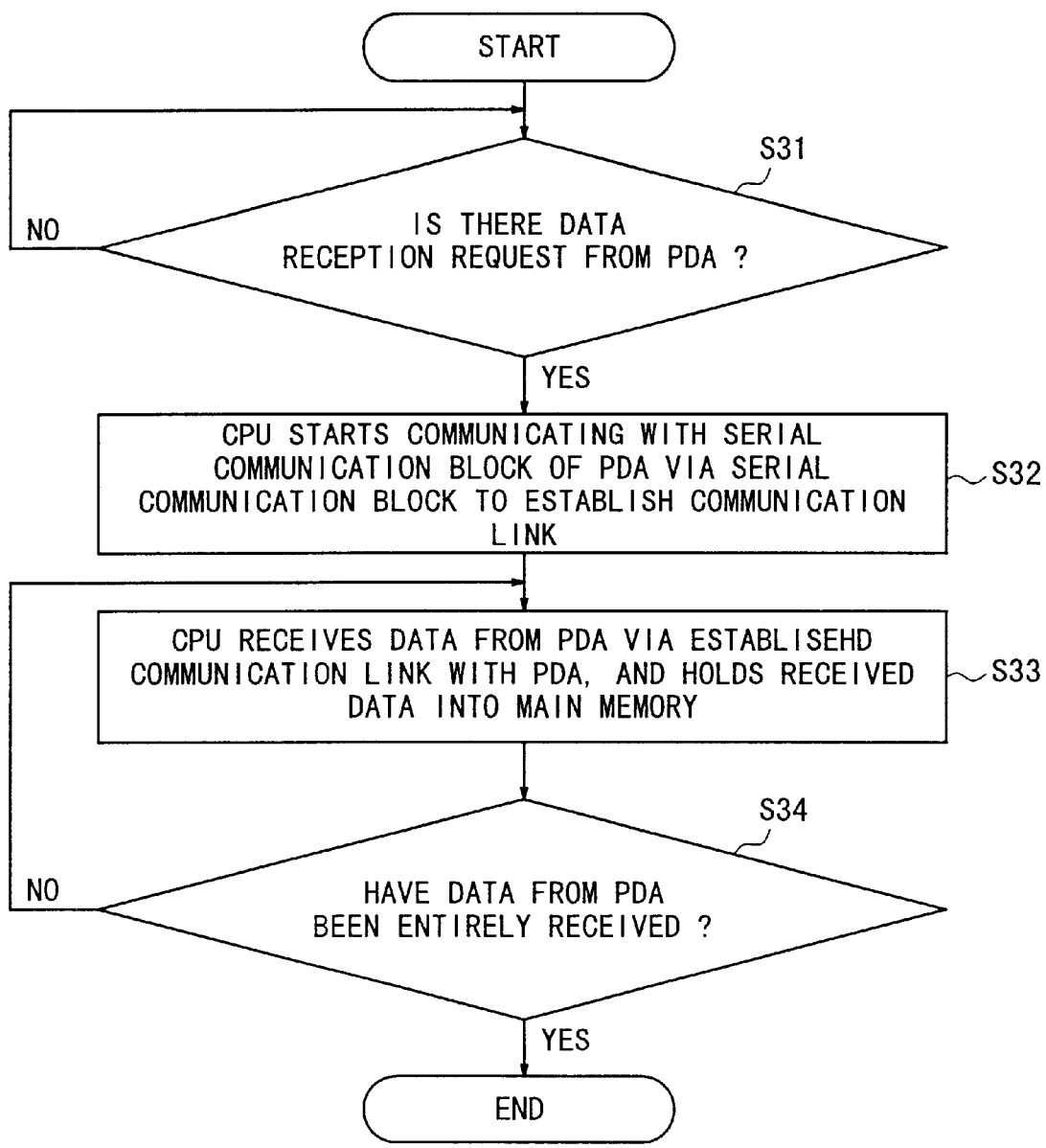
FIG. 8 is a flowchart of a processing sequence of the video game machine in the process of sending data from the device with the radio function to the video game machine via the portable computer.

Concurrent with the above process carried out by the portable computer 3, the video game machine 2 decides whether there is a data reception request from the portable computer 3 or not in step S31 shown in FIG. 8.

If the video game machine 2 confirms that there is a data reception request from the portable computer 3 in step S31, then the CPU 11 of the video game machine 2 starts communicating with the serial communication block 44 of the portable computer 3 via the serial communication block 17 to establish a communication link therewith in step S32.

Then, the CPU 11 stores data which have been received from the portable computer 3 via the established communication link therewith into the main memory 14 in step S33.

The processing in steps S32, S33 performed by the video game machine 2 corresponds to the processing in steps S23, S24 performed by the portable computer 3.

To confirm the end of the reception of the data from the portable computer 3, the CPU 11 decides whether the data from the portable computer 3 have entirely been received or not in step S34. If the CPU 11 confirms that the data from the portable computer 3 have entirely been received, then the video game machine 2 finishes the process of receiving the data. If the CPU 11 confirms that the data from the portable computer 3 have not entirely been received, then the video game machine 2 executes the processing from step S33 again.

The above processing sequences allow the data processing system 1 to send the data from the external device 4 with the radio function to the video game machine 2 via the portable computer 3.

A process of sending data from the video game machine 2 to the device 4 with the radio function, which is a reversal of the above process of sending data from the device 4 with the radio function to the video game machine 2, will be described below with reference to FIGS. 9 and 10.

Figure 9:
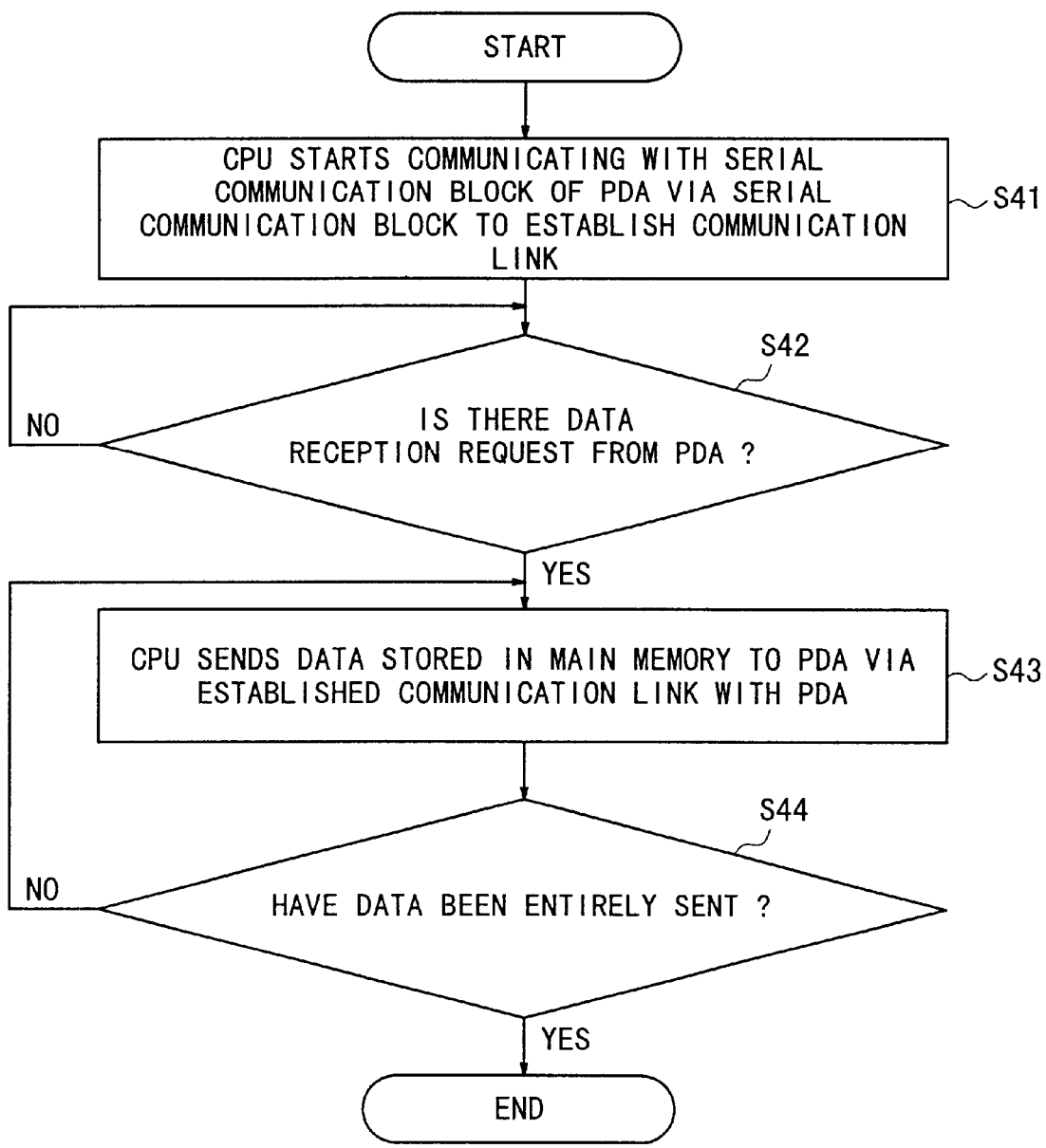
FIG. 9 is a flowchart of a processing sequence of the video game machine in a process of sending data from the video game machine to the device with the radio function via the portable computer.

The CPU 11 of the video game machine 2 starts communicating with the serial communication block 44 of the portable computer 3 via the serial communication block 17 to establish a communication link therewith in step S41 shown in FIG. 9.

Then, the video game machine 2 decides whether there is a data transmission request from the portable computer 3 or not in step S42.

The CPU 11 sends data which have been stored in the main memory 14 to the portable computer 3 via the established communication link therewith in step S43.

To confirm the end of the transmission of the data to the portable computer 3, the CPU 11 decides whether the data have entirely been sent or not in step S44. If the CPU 11 confirms that the data have entirely been sent, then the video game machine 2 finishes the process of sending the data. If the CPU 11 confirms that the data have not entirely been sent, then the video game machine 2 executes the processing from step S43 again. Concurrent with the above process carried out by the video game machine 2, the portable computer 3 decides whether there is a data reception request from the video game machine 2 or not in step S51 shown in FIG. 10.

If there is a data reception request from the video game machine 2 in step S51, then the CPU 45 of the portable computer 3 starts communicating with the serial communication block 17 of the video game machine 2 via the serial communication block 44 to establish a communication link therewith in step S52.

The CPU 45 also starts communicating with the radio communication block (not shown) of the device 4 with the radio function via the radio communication block 41 to establish a communication link therewith in step S53.

In step S54, the CPU 45 sends a data transmission request to the video game machine 2.

The CPU 45 stores data which have been received from the video game machine 2 via the established communication link therewith into the working memory 43 or the nonvolatile memory 42 in step S55.

The CPU 45 sends the data stored in the working memory 43 or the nonvolatile memory 42 to the device 4 with the radio function via the established communication link therewith in step S56.

The processing in steps S52, S55 performed by the portable computer 3 corresponds to the processing in steps S41, S43 performed by the video game machine 2.

To confirm the end of the reception of the data from the video game machine 2, the CPU 45 decides whether the data from the video game machine 2 have entirely been received or not in step S47. If the CPU 45 confirms that the data from the video game machine 2 have entirely been received, then the portable computer 3 finishes the process of receiving the data. If the CPU 45 confirms that the data from the video game machine 2 have not entirely been received, then the portable computer 3 executes the processing from step S55 again.

The above processing sequences allow the data processing system 1 to send the data from the video game machine 2 to the external device 4 with the radio function via the portable computer 3.

In the data processing system 1, consequently, data can be transferred between the video game machine 2 and the external device 4 with the radio function via the portable computer 3.

In the data processing system 1, the video game machine 2 can process data that have been sent from the external device 4 with the radio function via the portable computer 3 to the video game machine 2. A process of processing the data thus sent will be described below with reference to FIGS. 11 through 14.

Figure 11:
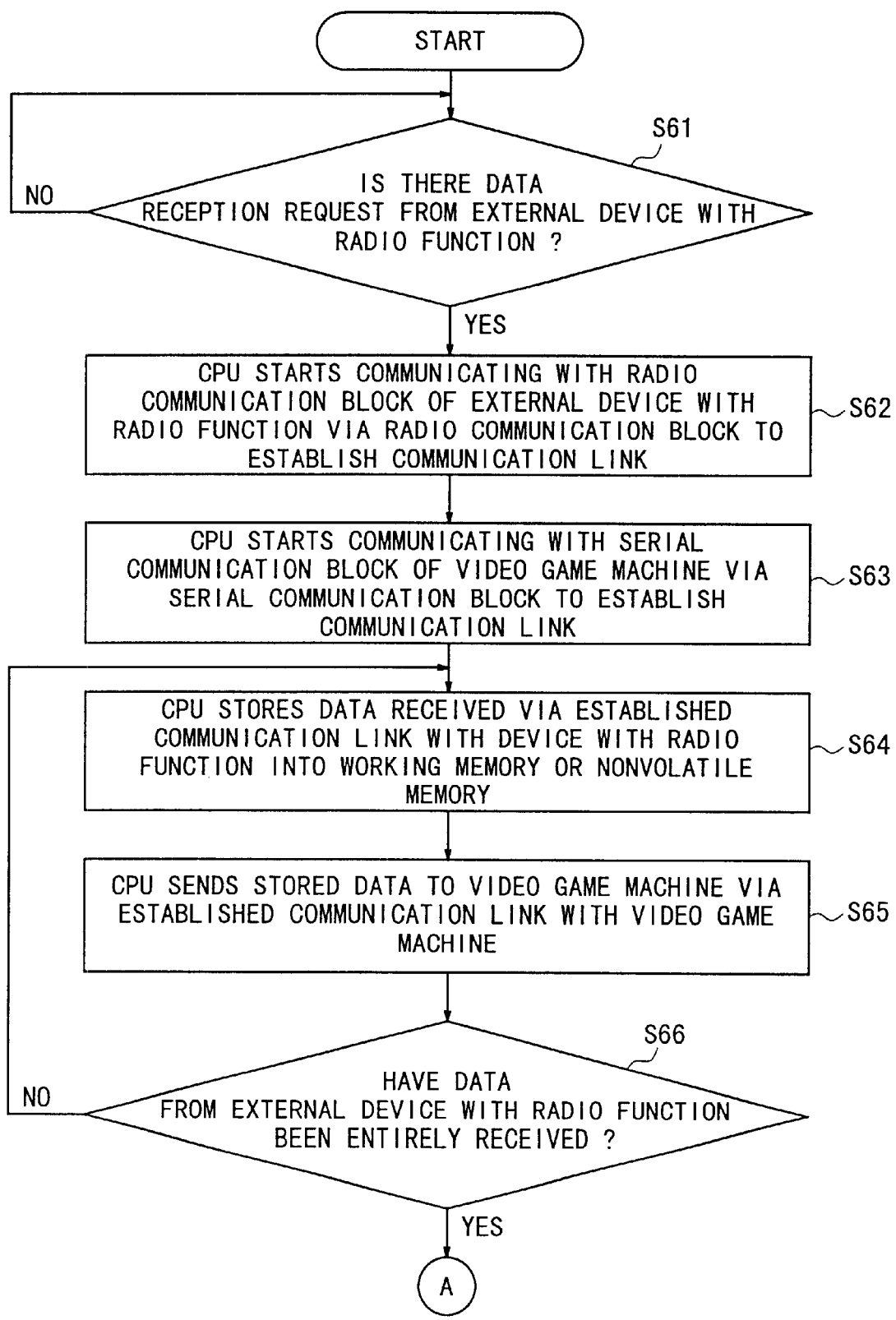
FIG. 11 is a flowchart of a processing sequence of the portable computer in a process of sending data from the device with the radio function to the video game machine and processing the data with the video game machine.

In step S61 shown in FIG. 11, the portable computer 3 decides whether there is a data reception request from the external device 4 with the radio function or not.

If the portable computer 3 confirms that there is a data reception request from the external device 4 with the radio function in step S61, then the CPU 45 of the portable computer 3 starts communicating with the radio communication block (not shown) of the device 4 with the radio function via the radio communication block 41 to establish a communication link therewith in step S62.

Then, the CPU 45 starts communicating with the serial communication block 17 of the video game machine 2 via the serial communication block 44 to establish a communication link therewith in step S63.

The CPU 45 stores data which have been received from the device 4 with the radio function via the established communication link therewith into the working memory 43 or the nonvolatile memory 42 in step S64.

The CPU 45 then sends the data stored in the working memory 43 or the nonvolatile memory 42 to the video game machine 2 via the established communication link with the video game machine 2 in step S65.

To confirm the end of the reception of the data from the external device 4 with the radio function, the CPU 45 decides whether the data from the external device 4 with the radio function have entirely been received or not in step S66. If the CPU 45 confirms that the data from the external device 4 with the radio function have entirely been received, then control goes to step S67 shown in FIG. 12. If the CPU 45 confirms that the data from the external device 4 with the radio function have not entirely been received, then the portable computer 3 executes the processing from step S64 again.

Figure 13:
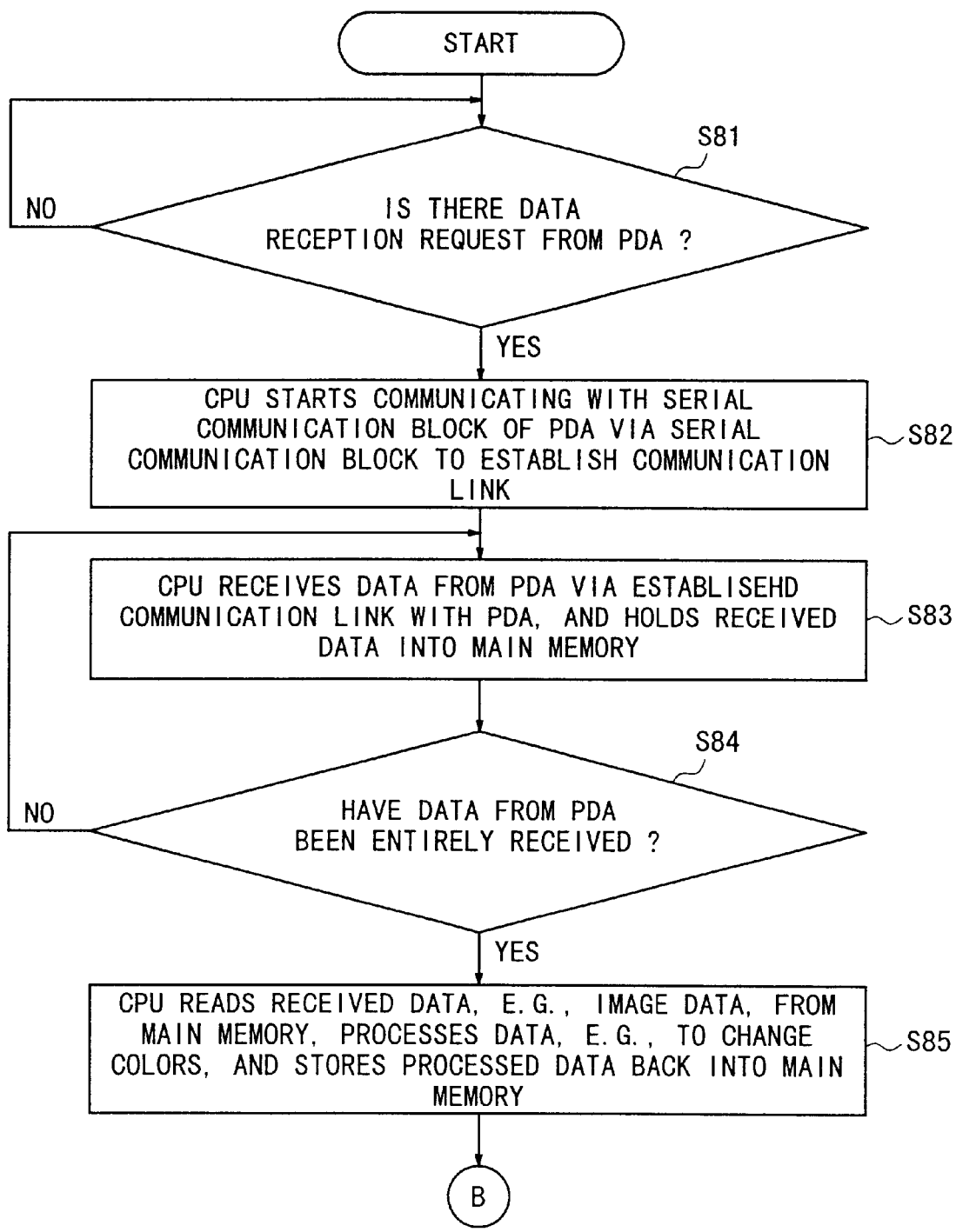
FIG. 13 is a flowchart of a processing sequence of the video game machine in a process of sending data from the device with the radio function to the video game machine and processing the data with the video game machine.

Concurrent with the above process carried out by the portable computer 3, the video game machine 2 decides whether there is a data reception request from the portable computer 3 or not in step S81 shown in FIG. 13.

If the video game machine 2 confirms that there is a data reception request from the portable computer 3 in step S81, then the CPU 11 of the video game machine 2 starts communicating with the serial communication block 44 of the portable computer 3 via the serial communication block 17 to establish a communication link therewith in step S82.

Then, the CPU 11 stores data which have been received from the portable computer 3 via the established communication link therewith into the main memory 14 in step S83.

The processing in steps S82, S83 performed by the video game machine 2 corresponds to the processing in steps S63, S64 performed by the portable computer 3.

To confirm the end of the reception of the data from the portable computer 3, the CPU 11 decides whether the data from the portable computer 3 have entirely been received or not in step S84. If the CPU 11 confirms that the data from the portable computer 3 have entirely been received, then the video game machine 2 processes the data in step S85. If the CPU 11 confirms that the data from the portable computer 3 have not entirely been received, then the video game machine 2 executes the processing from step S83 again.

After having entirely received the data from the portable computer 3, the video game machine 2 reads the data stored in the main memory 14. If the received data are image data, for example, the video game machine 2 processes the data to change colors, for example.

The video game machine 2, which also functions as a processing means, can process the data according to a programmed sequence. Alternatively, the video game machine 2 can process the data according to instructions entered by the user via the input block 12, which also functions as the processing means. Specifically, when the user presses a button on a controller (not shown) associated with the input block 12, the video game machine 2 can increase or reduce the lightness of image data, for example, depending on the period of time for which the button is continuously pressed.

Therefore, the data sent from the external device 4 with the radio function via the portable computer 3 to the video game machine 2 are processed by the video game machine 2. The processed data are then stored in the main memory 14 of the video game machine 2.

The processed data can subsequently be sent from the video game machine 2 via the portable computer 3 to the device 4 with the radio function.

Figure 14:
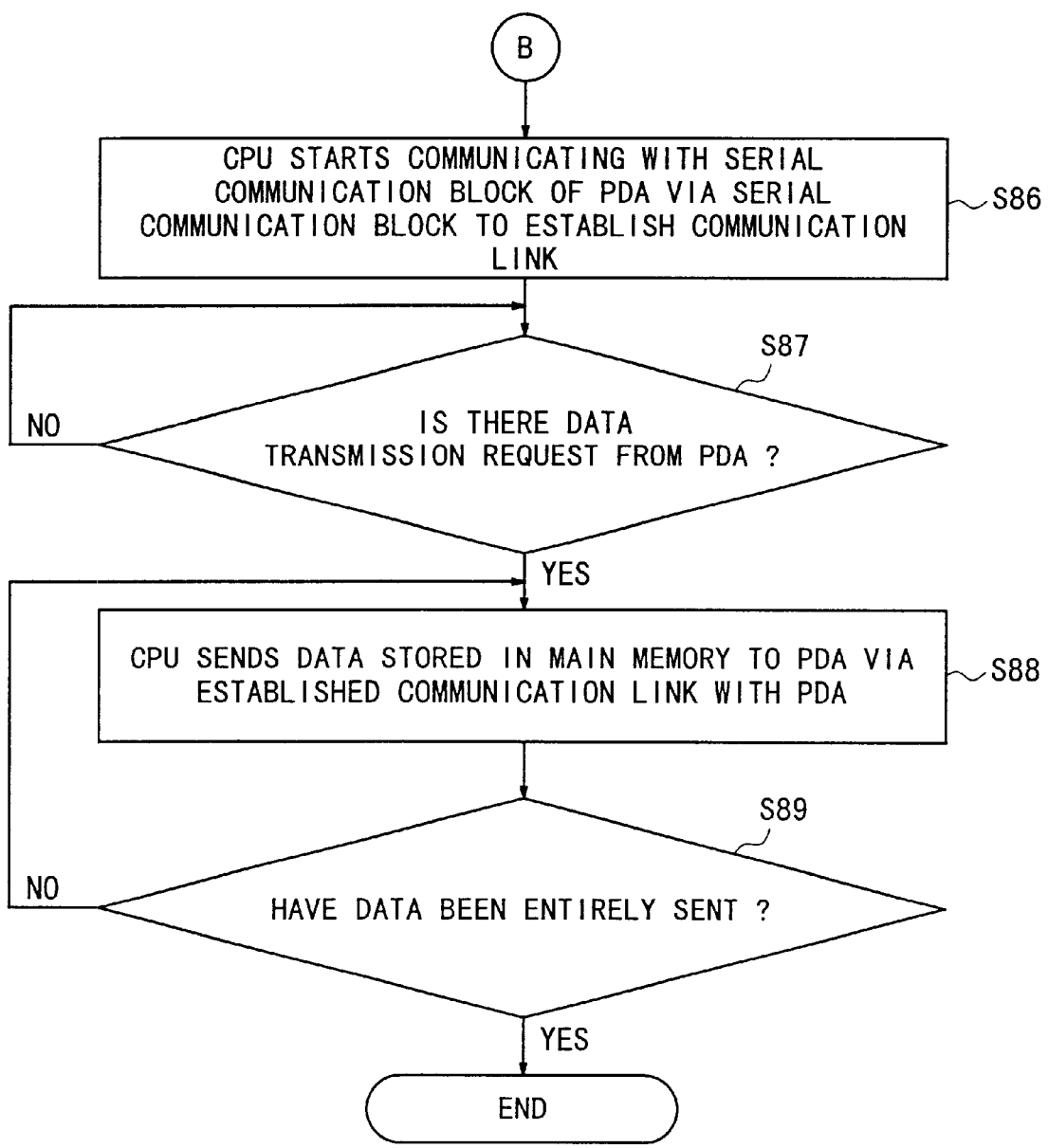
FIG. 14 is a flowchart of a processing sequence of the video game machine in a process of sending the processed data from the video game machine back to the device with the radio function.

Specifically, the CPU 11 starts communicating with the serial communication block 44 of the portable computer 3 via the serial communication block 17 to establish a communication link therewith in step S86 shown in FIG. 14.

The video game machine 2 decides whether there is a data transmission request from the portable computer 3 or not in step S87.

If the video game machine 2 confirms that there is a data reception request from the portable computer 3 in step S87, then the CPU 11 sends the processed data stored in the main memory 14 to the portable computer 3 via the established communication link therewith in step S88.

To confirm the end of the transmission of the data to the portable computer 3, the CPU 11 decides whether the data have entirely been sent or not in step S89. If the CPU 11 confirms that the data have entirely been sent, then the video game machine 2 finishes the process of sending the data. If the CPU 11 confirms that the data have not entirely been sent, then the video game machine 2 executes the processing from step S88 again.

Figure 12:
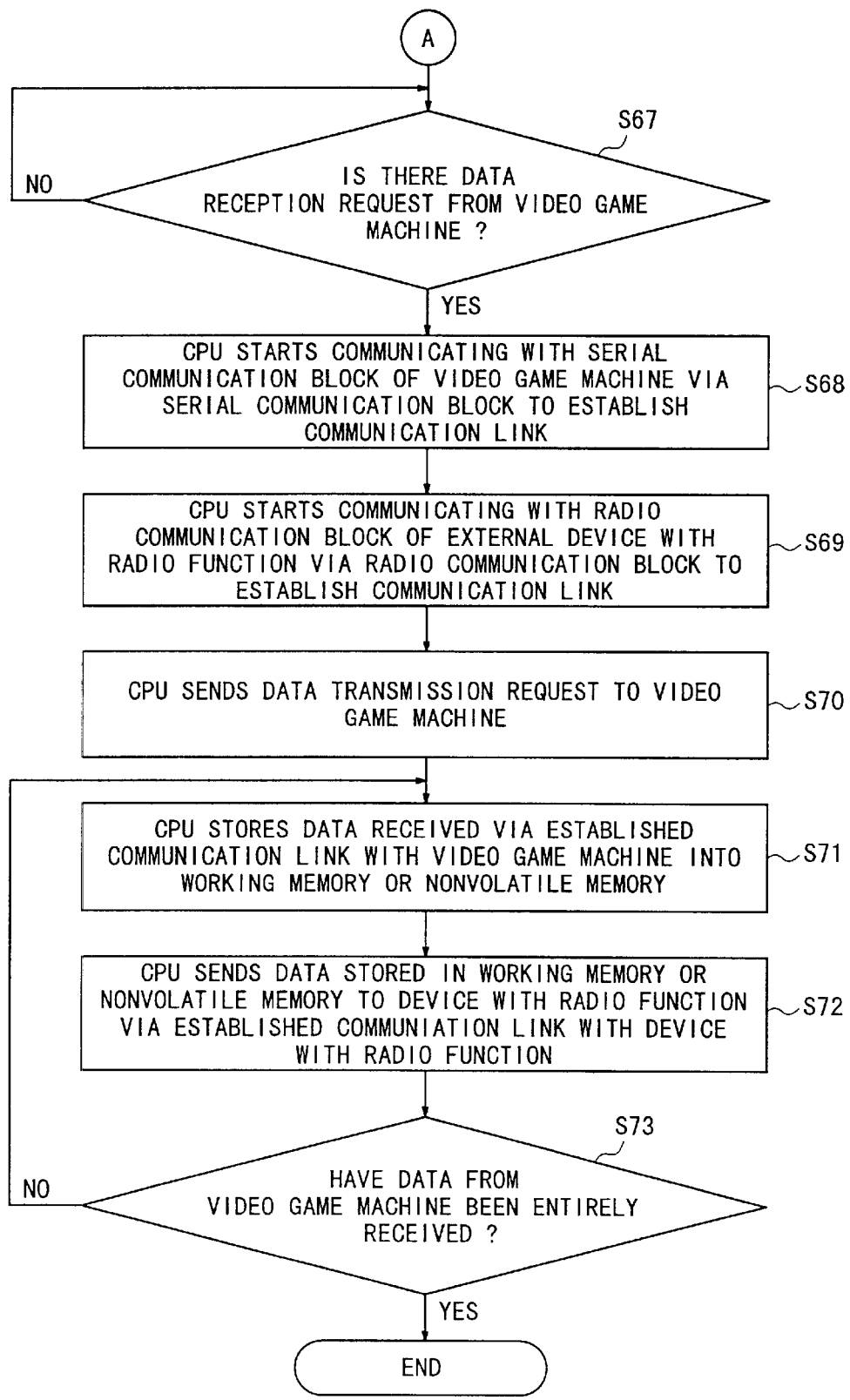
FIG. 12 is a flowchart of a processing sequence of the portable computer in a process of sending the processed data from the video game machine back to the device with the radio function.

Concurrent with the above process carried out by the video game machine 2, the portable computer 3 decides whether there is a data reception request from the video game machine 2 or not in step S67 shown in FIG. 12.

If there is a data reception request from the video game machine 2 in step S67, then the CPU 45 of the portable computer 3 starts communicating with the serial communication block 17 of the video game machine 2 via the serial communication block 44 to establish a communication link therewith in step S68.

The CPU 45 also starts communicating with the radio communication block (not shown) of the device 4 with the radio function via the radio communication block 41 to establish a communication link therewith in step S69.

In step S70, the CPU 45 sends a data transmission request to the video game machine 2.

The CPU 45 stores the processed data which have been received from the video game machine 2 via the established communication link therewith into the working memory 43 or the nonvolatile memory 42 in step S71.

The processing in step S68, S71 performed by the portable computer 3 corresponds to the processing in step S86, S88 performed by the video game machine 2.

The CPU 45 sends the data stored in the working memory 43 or the nonvolatile memory 42 to the device 4 with the radio function via the established communication link therewith in step S72.

To confirm the end of the reception of the data from the video game machine 2, the CPU 45 decides whether the data from the video game machine 2 have entirely been received or not in step S73. If the CPU 45 confirms that the data from the video game machine 2 have entirely been received, then the portable computer 3 finishes the process of receiving the data. If the CPU 45 confirms that the data from the video game machine 2 have not entirely been received, then the portable computer 3 executes the processing from step S71 again.

The above processing sequences allow the data processing system 1 to send the data from the external device 4 with the radio function to the video game machine 2 via the portable computer 3. After the data have been processed by the video game machine 2, the processed data are sent via the portable computer 3 to the device 4 with the radio function.

In the data processing system 1, as described above, the communication application 50 and the radio communication driver 70 for the portable computer 3 which are compatible with the device 4 with the radio function are supplied from the video game machine 2 to the portable computer 3 when required, and then run by the portable computer 3. Therefore, it is not necessary for the communication application 50 and the radio communication driver 70 to be resident in the portable computer 3, and hence computational resources of the portable computer 3 can effectively be utilized.

Since the portable computer 3 is easily removably connectable to the video game machine 2, the communication application 50 and the radio communication driver 70 for the portable computer 3 which are compatible with the device 4 with the radio function may be held by the portable computer 3, and the portable computer 3 may be replaced each time the device 4 with the radio function is changed. Consequently, a variety of devices 4 of different types can be connected to the video game machine 2.

Even if the memory such as the nonvolatile memory 42 of the portable computer 3 is of a small storage capacity and fails to store entire data sent from and received by the portable computer 3, the portable computer 3 can send and receive a large amount of data by successively sending data to the video game machine 2 or successively receiving data from the video game machine 2.

In the data processing system 1, the portable computer 3 does not need to be connected to the video game machine 2 in use. One the portable computer 3 is supplied with the communication application 50 and the radio communication driver 70 from the video game machine 2, since the portable computer 3 can run the communication application 50, etc. via the input block 46, the portable computer 3 singly can operate the device 4 with the radio function. Therefore, data from the device 4 with the radio function may be held by the portable computer 3 depending on a control input action entered via the portable computer 3, and the portable computer 3 may subsequently be connected to the video game machine 2 for data processing. Thus, there can be constructed a highly efficient system with good portability.

In the video game machine 2, the communication application 50 and the radio communication driver 70 to be supplied to the portable computer 3 do not need to be recorded in a recording medium such as a CD-ROM or the like, but may be acquired via communications with an external source.

A data processing system 101 according to a second embodiment of the present invention will be described below with reference to FIG. 15. The data processing system 101 has a basic arrangement similar to the data processing system 1 according to the first embodiment, except that two portable computers 3a, 3b are connected to the video game machine 2. Those parts of the data processing system 101 which are identical to those of the data processing system 1 are denoted by identical reference characters, and will not be described in detail below.

Figure 15:
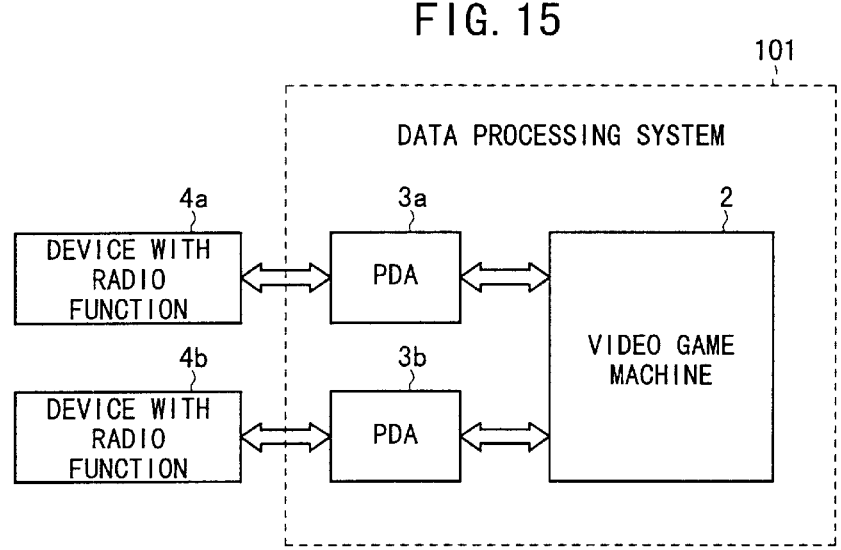
FIG. 15 is a block diagram of a data processing system according to a second embodiment of the present invention and devices with a radio function.

As shown in FIG. 15, the data processing system 101 comprises a video game machine 2 serving as a master unit for processing data and two portable computers 3a, 3b each serving as a slave unit. The video game machine 2 has two terminals (not shown) in the serial communication block 17, and the portable computers 3a, 3b are removably connectable to the video game machine 2 through those terminals, as with the first embodiment. The portable computers 3a, 3b have been supplied in advance with respective communication applications 50 and respective radio communication drivers 70 which are compatible with respective devices 4a, 4b with a radio function.

Each of the portable computers 3a, 3b is structurally identical to the portable computer 3 according to the first embodiment.

In the data processing system 101, data can be inputted from the device 4a with the radio function via the portable computer 3a to the video game machine 2, and data can be outputted from the video game machine 2 via the other portable computer 3b to the other device 4b with the radio function.

Figure 7:
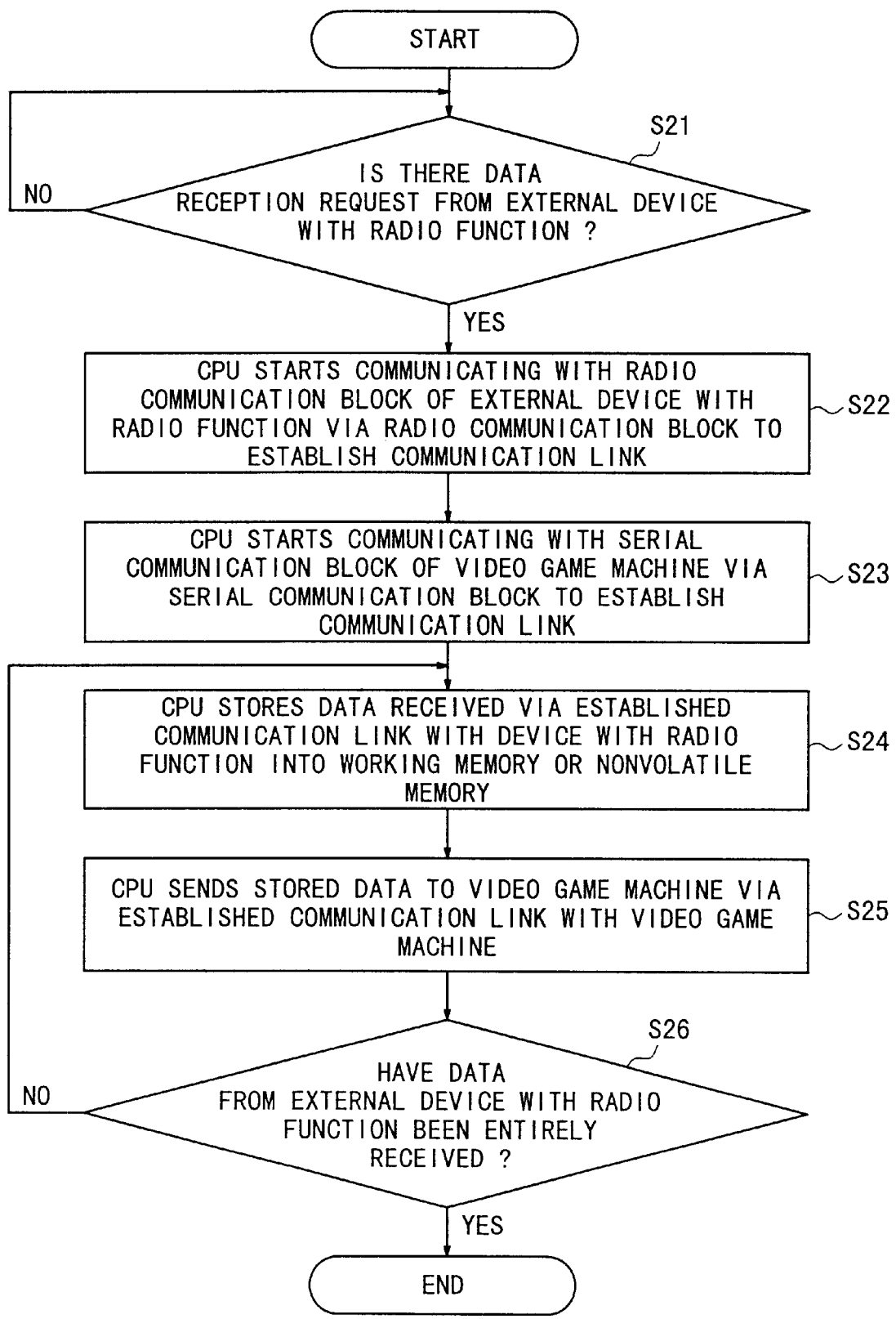
FIG. 7 is a flowchart of a processing sequence of the portable computer in a process of sending data from the device with the radio function to the video game machine via the portable computer.
Figure 10:
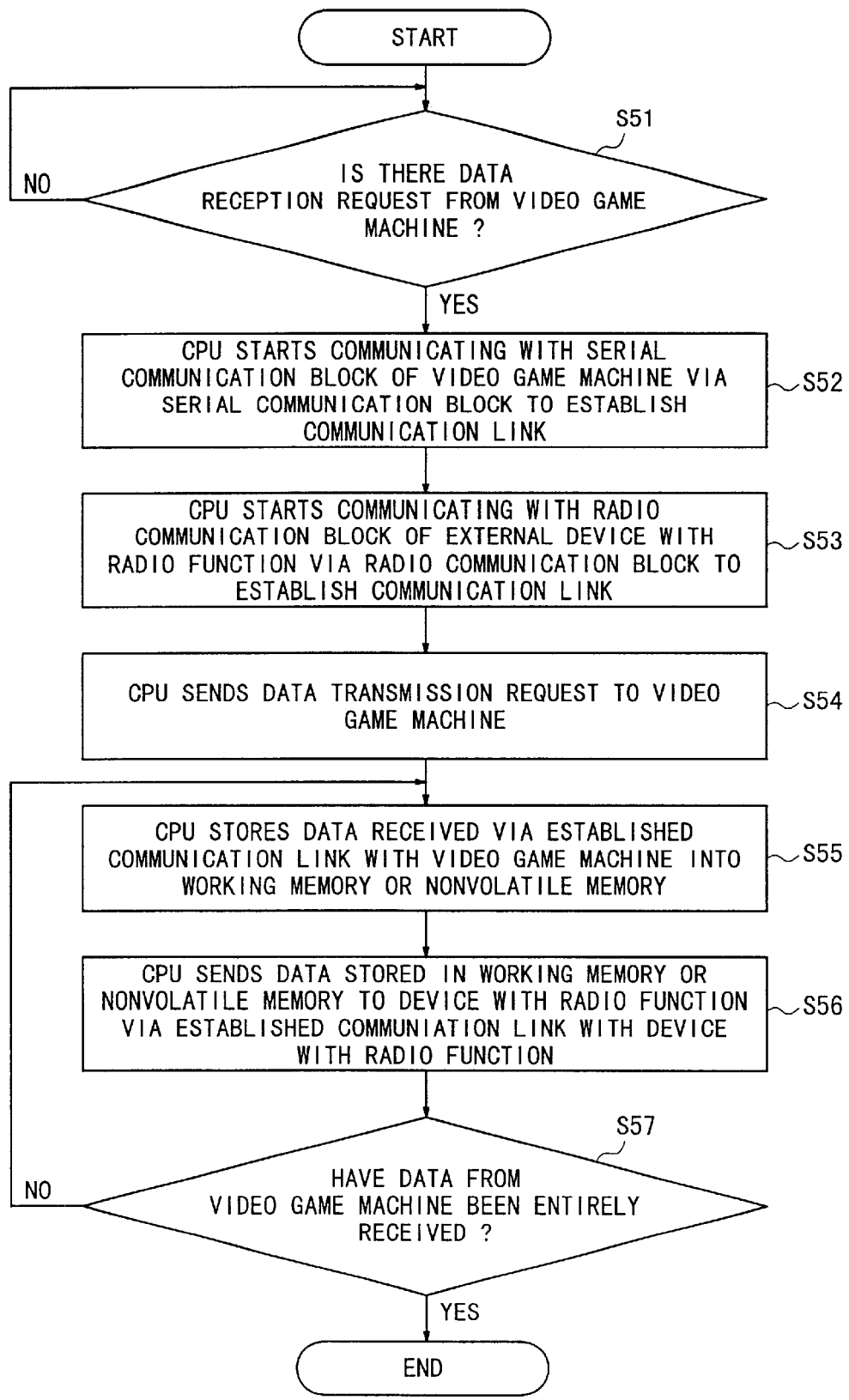
FIG. 10 is a flowchart of a processing sequence of the portable computer in the process of sending data from the video game machine to the device with the radio function via the portable computer.

Specifically, the video game machine 2 and the portable computer 3a can perform the processing sequences shown in FIGS. 7 and 8 to input data from the device 4a with the radio function via the portable computer 3a to the video game machine 2, and the video game machine 2 and the portable computer 3b can perform the processing sequences shown in FIGS. 9 and 10 to input data from the video game machine 2 via the portable computer 3b to device 4b with the radio function.

Therefore, with the two portable computers 3a, 3b connected to the video game machine 2, the portable computer 3a can transmit input data to the video game machine 2 and the other portable computer 3b can transmit output data from the video game machine 2, independently of each other.

In the data processing system 101, consequently, the video game machine 2 and the two portable computers 3a, 3b can be connected to each other to send and receive data.

In the data processing system 101, furthermore, data from the device 4a with the radio function can be processed by the video game machine 2. For such data processing, data inputted from the device 4a with the radio function via the portable computer 3a to the video game machine 2 in steps S61 through S66 shown in FIG. 11 and steps S81 through S84 shown in FIG. 13 are processed by the video game machine 2 in step S85 shown in FIG. 13, and the processed data are outputted to the other portable computer 3b and transmitted to the other device 4b with the radio function in steps S67 through S73 shown in FIG. 12 and steps S86 through S89 shown in FIG. 14. At this time, the data may be processed by the video game machine 2 according to a control input action entered by the user via the input block 12.

In the data processing system 101, data successively sent from the device 4a with the radio function via the portable computer 3a to the video game machine 2 can be processed by the video game machine 2, and the processed data can be sent via the portable computer 3b to the other device 4b with the radio function and used by the device 4b with the radio function.

In the data processing system 101, furthermore, if the device 4a with the radio function can communicate with the portable computers 3a, 3b via radio links, then data successively sent from the device 4a with the radio function via the portable computer 3a to the video game machine 2 can be processed by the video game machine 2, and the processed data can be sent via the portable computer 3b back to the device 4a with the radio function.

A data processing system 151 according to a third embodiment of the present invention will be described below with reference to FIG. 16. The data processing system 151 has a basic arrangement similar to the data processing system 101 according to the second embodiment, except that three or more portable computers are connected to the video game machine 2. Those parts of the data processing system 151 which are identical to those of the data processing system 101 are denoted by identical reference characters, and will not be described in detail below. In the illustrated embodiment, three portable computers 3a, 3b, 3c are connected to the video game machine 2.

Figure 16:
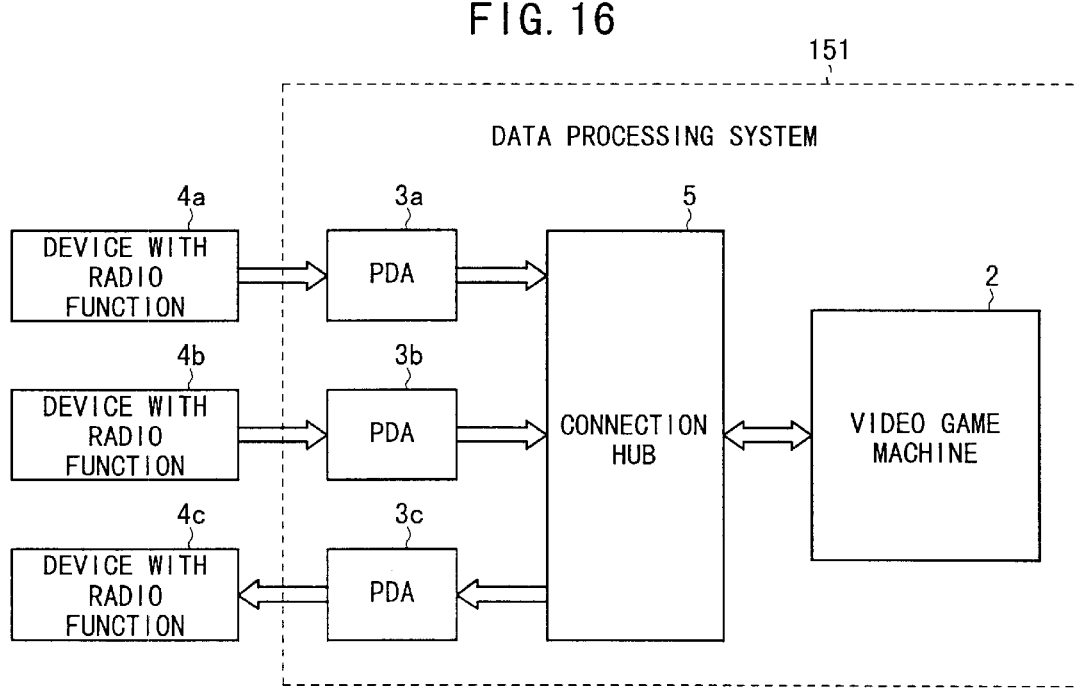
FIG. 16 is a block diagram of a data processing system according to a third embodiment of the present invention and devices with a radio function.

As shown in FIG. 16, the data processing system 151 comprises a video game machine 2 serving as a master unit for processing data, three portable computers 3a, 3b, 3c each serving as a slave unit, and a connection hub 5 by which the portable computers 3a, 3b, 3c are connected to the video game machine 2. The connection hub 5 is used to provide a sufficient number of terminals if the terminals (not shown) of the serial communication block 17 of the video game machine 2 are fewer than the number of the portable computers to be connected. The connection hub 5 is connected to a terminal of the video game machine 2, and a plurality of portable computers are removably connected to the connection hub 5. The terminals of the connection hub 5 and the terminal of the video game machine 2 have electrically and physically identical specifications.

In the data processing system 151, the three portable computers 3a, 3b, 3c are electrically connected to the video game machine 2 by the connection hub 5. The portable computers 3a, 3b, 3c have been supplied in advance with respective communication applications 50 and respective radio communication drivers 70 which are compatible with respective devices 4a, 4b, 4c with a radio function.

Each of the portable computers 3a, 3b, 3c is structurally identical to the portable computer 3 according to the first embodiment.

In the data processing system 151, as with the data processing system 101 according to the second embodiment, a portable computer for supplying data to the video game machine 2 and a portable computer for being supplied with data from the video game machine 2 can be different from each other.

Specifically, in the data processing system 151, the video game machine 2 and the portable computers 3a, 3b can perform the operation sequences shown in FIGS. 7 and 8 to input data from the devices 4a, 4b with the radio function via the portable computers 3a, 3b to the video game machine 2, and the video game machine 2 and the portable computer 3c can perform the processing sequences shown in FIGS. 9 and 10 to input data from the video game machine 2 via the portable computer 3c to device 4c with the radio function.

For such a mode of operation, the user operates the input block 12 to establish the portable computers 3a, 3b as portable computers for inputting data to the video game machine 2, and establish the portable computer 3c as a portable computer for outputting data from the video game machine 2. Furthermore, settings are made in the communication application 50 supplied from the video game machine 2 or another application run by the video game machine 2 to distinguish the portable computers 3a, 3b for inputting data to the video game machine 2 from the portable computer 3c for outputting data from the video game machine 2.

Even with plural portable computers connected to the video game machine 2 by the connection hub 5, they can be divided into those for inputting data from external devices with a radio function to the video game machine 2 and those for inputting data from the video game machine 2 to external devices with a radio function, and the different groups of portable computers can input the data independently of each other.

In the data processing system 151, consequently, the video game machine 2 and the three or more portable computers can be connected to each other to send and receive data.

In the data processing system 151, furthermore, as with the data processing system 101 according to the second embodiment, data inputted from the devices 4a, 4b with the radio function via the portable computers 3a, 3b to the video game machine 2 in steps S61 through S66 shown in FIG. 11 and steps S81 through S84 shown in FIG. 13 are processed by the video game machine 2 in step S85 shown in FIG. 13, and the processed data are outputted to the other portable computer 3c and transmitted to the other device 4c with the radio function in steps S67 through S73 shown in FIG. 12 and steps S86 through S89 shown in FIG. 14. Accordingly, the data inputted from the devices 4a, 4b with the radio function via the portable computers 3a, 3b to the video game machine 2 can be processed by the video game machine 2, and the processed data can be sent via the portable computer 3c to the device 4c with the radio function.

In the data processing system 151, the portable computers connected to the video game machine 2 are not limited to three portable computers, but may be as many portable computers as possible.

A data processing system 201 according to a fourth embodiment of the present invention will be described below with reference to FIG. 17. The data processing system 201 has a basic arrangement similar to the data processing system 1 according to the first embodiment, except that two devices with a radio function are connected to the portable computer 3. Those parts of the data processing system 102 which are identical to those of the data processing system 1 are denoted by identical reference characters, and will not be described in detail below.

Figure 17:
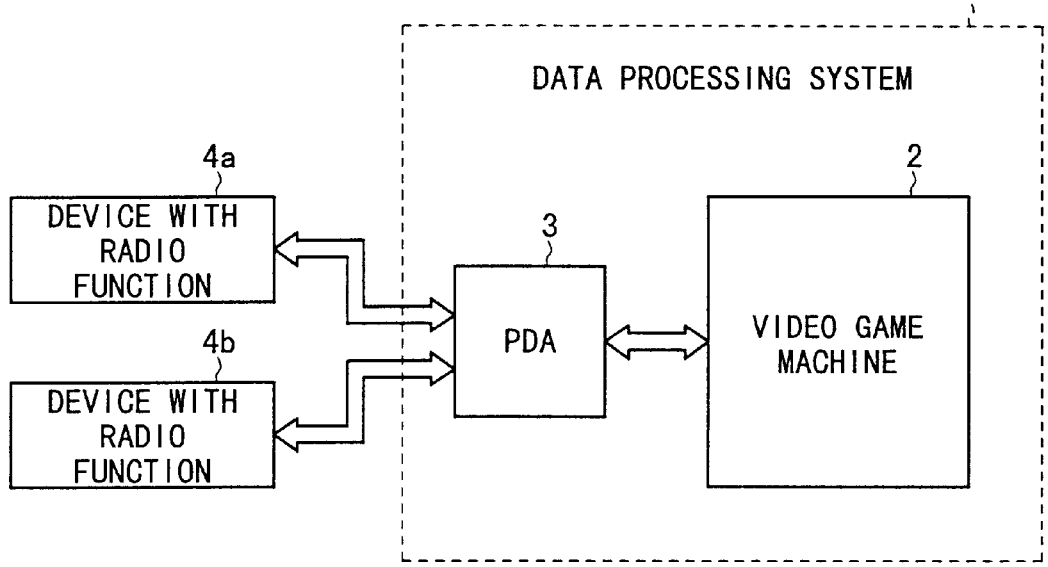
FIG. 17 is a block diagram of a data processing system according to a fourth embodiment of the present invention and devices with a radio function.

As shown in FIG. 17, the data processing system 201 comprises a video game machine 2 serving as a master unit for processing data and a portable computer 3 serving as a slave unit. The portable computer 3 is removably connected to the video game machine 2. The portable computer 3 is connected to two devices 4a, 4b with a radio function for radio communications with each other in a time-division or bandwidth-division fashion. The portable computer 3 has been supplied in advance with communication applications 50 and radio communication drivers 70 which are compatible with the respective devices 4a, 4b with the radio function.

In the data processing system 201, the portable computer 3 can receive data from the device 4a with the radio function, and output data from the video game machine 2 to the other device 4b with the radio function.

In the data processing system 201, specifically, communication links established between the portable computer 3 and the devices with the radio function are changed such that data from the device 4a with the radio function are received by the portable computer 3 in steps S61 through S66 shown in FIG. 11 and data sent from the video game machine 2 are sent to the other device 4b with the radio function by the portable computer 3 in steps S67 through S73 shown in FIG. 12.

In the data processing system 201, consequently, the portable computer 3 and the two devices 4a, 4b with the radio function can be connected to each other to send and receive data.

In the data processing system 201, data successively sent from the device 4a with the radio function via the portable computer 3 to the video game machine 2 can be processed by the video game machine 2, and the processed data can be sent via the portable computer 3 to the other device 4b with the radio function and used by the device 4b with the radio function. At this time, the data may be processed by the video game machine 2 according to a control input action entered by the user via the input block 12.

A data processing system 251 according to a fifth embodiment of the present invention will be described below with reference to FIG. 18. The data processing system 251 has a basic arrangement similar to the data processing system 201 according to the fourth embodiment, except that three or more devices with a radio function are connected to the portable computer 3. Those parts of the data processing system 251 which are identical to those of the data processing system 1 are denoted by identical reference characters, and will not be described in detail below. In the illustrated embodiment, three devices 4a, 4b, 4c with a radio function are connected to the portable computer 3.

Figure 18:
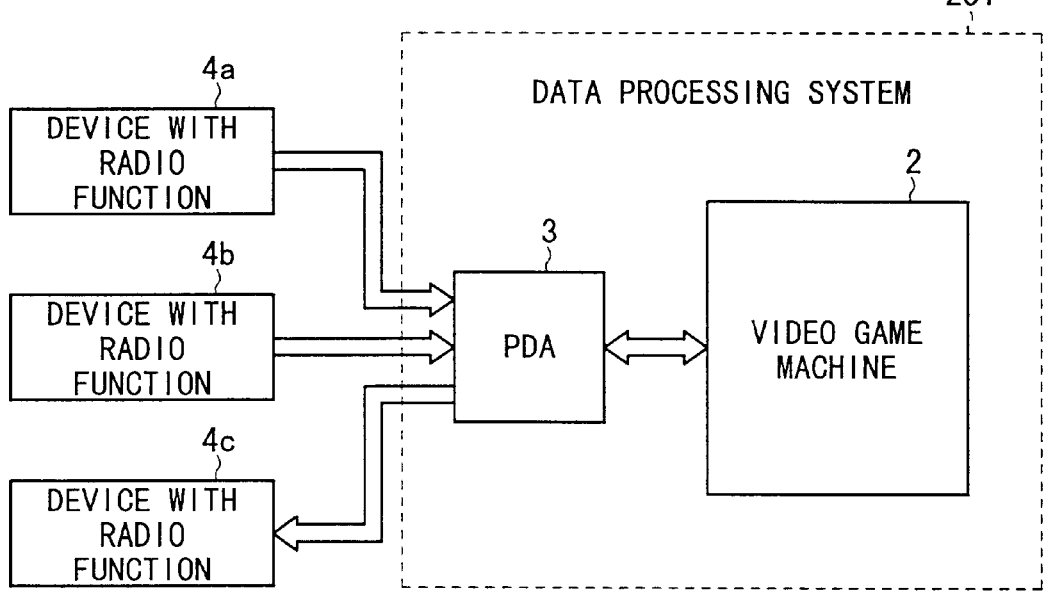
FIG. 18 is a block diagram of a data processing system according to a fifth embodiment of the present invention and devices with a radio function.

As shown in FIG. 18, the data processing system 251 comprises a video game machine 2 serving as a master unit for processing data and a portable computer 3 serving as a slave unit. The portable computer 3 is removably connected to the video game machine 2. The portable computer 3 is connected to three devices 4a, 4b, 4c with a radio function for radio communications with each other in a time-division or bandwidth-division fashion. The portable computer 3 has been supplied in advance with communication applications 50 and radio communication drivers 70 which are compatible with the respective devices 4a, 4b, 4c with the radio function.

In the data processing system 251, the portable computer 3 can receive data from the devices 4a, 4b with the radio function, and output data from the video game machine 2 to the device 4c with the radio function.

In the data processing system 251, specifically, communication links established between the portable computer 3 and the devices with the radio function are changed such that data from the devices 4a, 4b with the radio function are received by the portable computer 3 in steps S61 through S66 shown in FIG. 11 and data sent from the video game machine 2 are sent to the device 4c with the radio function by the portable computer 3 in steps S67 through S73 shown in FIG. 12.

For such a mode of operation, the user operates the input block 12 to establish the devices 4a, 4b with the radio function as devices for inputting data to the portable computer 3, and establish the device 4c with the radio function as a device for being supplied with data from the portable computer 3 in the data processing system 251. Furthermore, settings are made in the communication application 50 supplied from the video game machine 2 or another application run by the video game machine 2 to distinguish the devices 4a, 4b with the radio function for inputting data to the portable computer 3 from the device 4c with the radio function for being supplied with data from the portable computer 3 from each other in the data processing system 251.

In the data processing system 251, consequently, the portable computer 3 and the three or more devices with the radio function can be connected to each other to send and receive data.

In the data processing system 251, as with the data processing system 201 according to the fourth embodiment, data successively sent from the devices 4a, 4b with the radio function via the portable computer 3 to the video game machine 2 can be processed by the video game machine 2, and the processed data can be sent via the portable computer 3 to the device 4c with the radio function and used by the device 4c with the radio function.

A video entertainment system as a specific example of the data processing systems according to the above embodiments will be described below with reference to FIGS. 19 through 26. In FIGS. 19 through 26, the data processing system comprising the video game machine 2 and the portable computer 3 (the portable computers 3a, 3b, 3c in the second and third embodiments) is arranged as a video entertainment system which comprises a video game apparatus 301 and a portable electronic device 400.

The video game machine 2 corresponds to the video game apparatus 301, and the portable computer 3 corresponds to the portable electronic device 400. Specifically, the CPU 11 and the main memory 14 of the video game machine 2 correspond respectively to a CPU 351 and a main memory 353 of the video game apparatus 301 shown in FIG. 19, and the radio communication block 41, the nonvolatile memory 42, and the CPU 45 of the portable computer 3 correspond respectively to a wireless communication means 448, a nonvolatile memory 446, and a control means 441 shown in FIG. 25.

Figure 19:
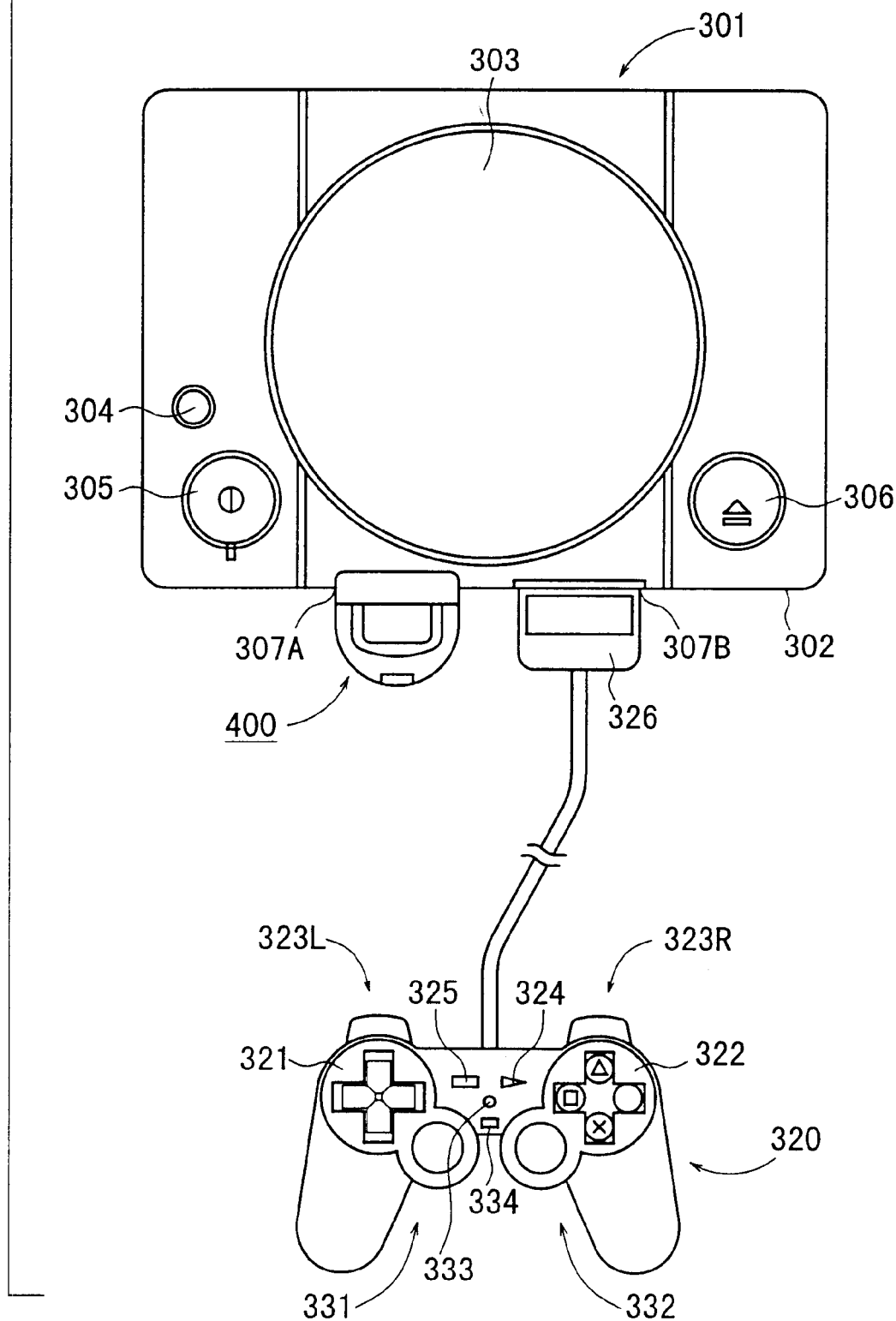
FIG. 19 is a plan view of a video entertainment system as a specific example of a data processing system which comprises a video game machine and a portable computer.
Figure 20:
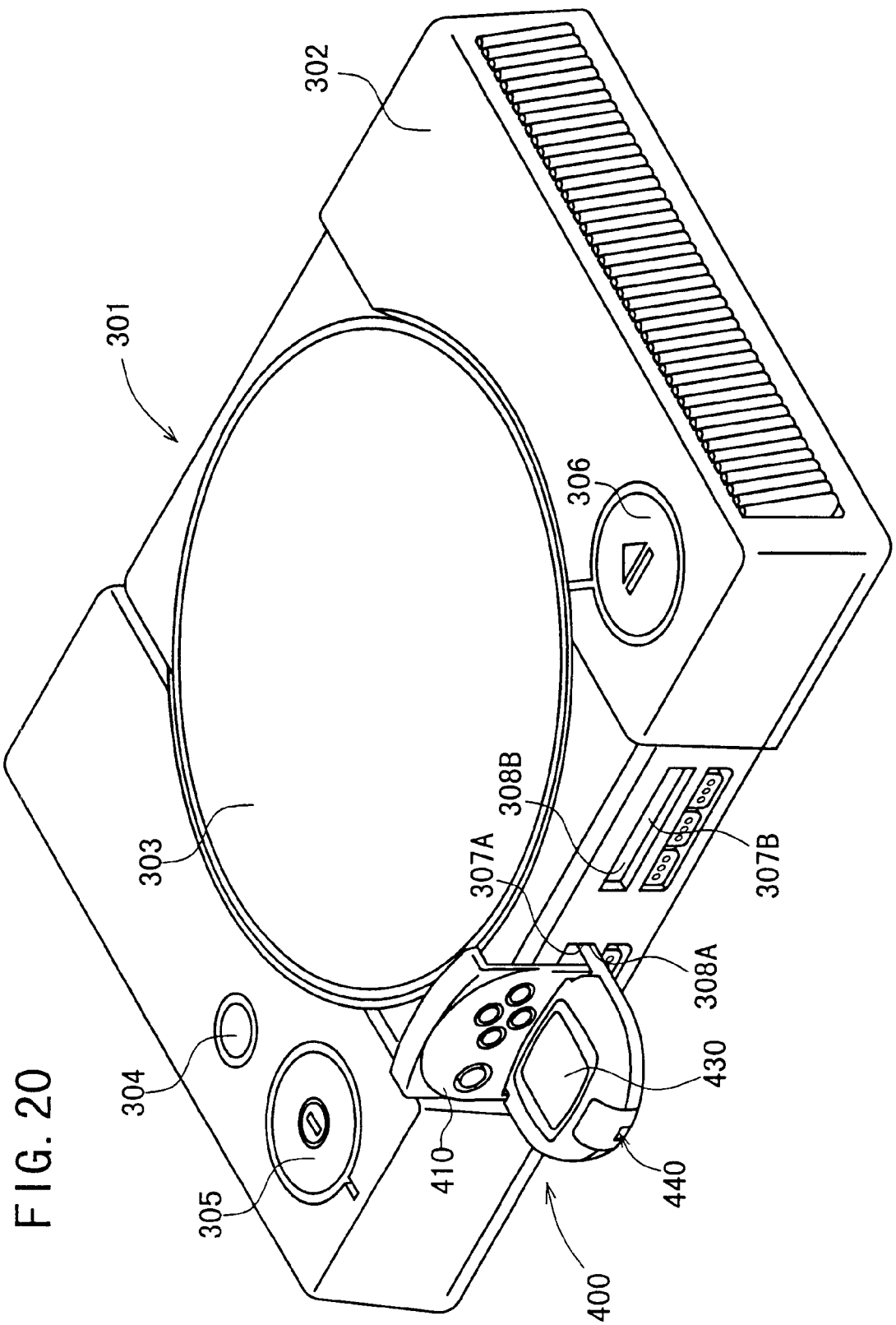
FIG. 20 is a perspective view of the video entertainment system shown in FIG. 19.

As shown in FIGS. 19 and 20, the video game apparatus 301 reads an application program from a recording medium, and executes the application program according to instructions from the user, i.e., the game player. For example, the video game apparatus 301 executes a game program mainly to proceed with a game, display game images, and output sounds.

The video game apparatus 301 has a rectangular casing 302 which houses a disk loading unit 303 substantially centrally therein for loading an optical disk such as a CD-ROM or the like as a recording medium for supplying an application program such as a game program or the like. The casing 302 supports a reset switch 304 for resetting a video game, a power supply switch 305, a disk control switch 306 for controlling the loading of the optical disk, and two slots 307A, 307B.

The video game apparatus 301 may be supplied with an application program via a communication link, rather than being supplied from the recording medium.

The portable electronic device 400 and a manual controller 320 can be connected to the slots 307A, 307B. A memory card system (not shown) may also be connected to the slots 307A, 307B.

The manual controller 320 has first and second control pads 321, 322, a left button 323L, a right button 323R, a start button 324, a selector button 325, analog control pads 331, 332, a mode selector switch 333 for selecting control modes for the analog control pads 331, 332, and an indicator 334 for indicating a selected control mode. The manual controller 320 also has a vibration imparting mechanism (not shown) disposed therein for imparting vibrations to the manual controller 320 depending on how the video game proceeds. The manual controller 320 is electrically connected to the slot 307B in the casing 302 by a connector 326.

If two manual controllers 320 are connected respectively to the slots 307A, 307B, two users or game players can share the video entertainment system to play a competition game, for example. The video game apparatus 301 may have more or less than two slots 307A, 307B.

Figure 21:
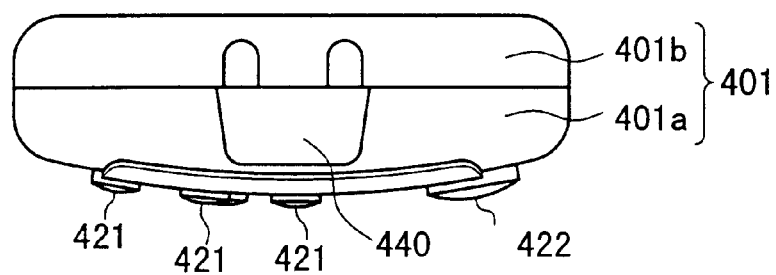
FIG. 21 is a plan view of a portable electronic device as a specific example of the portable computer.
Figure 22:
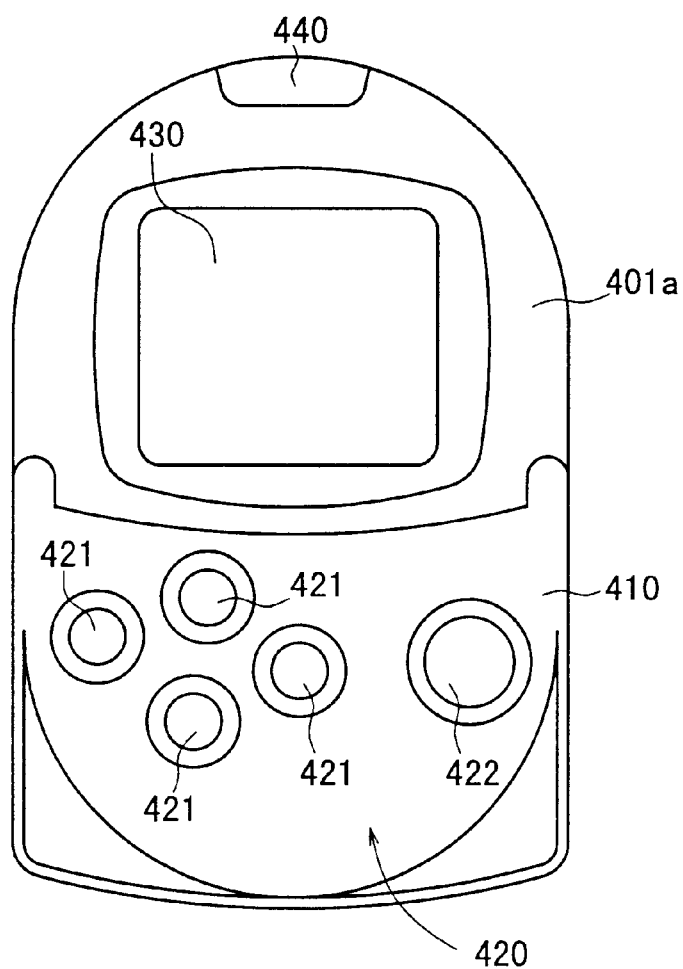
FIG. 22 is a front elevational view of the portable electronic device shown in FIG. 21.
Figure 23:
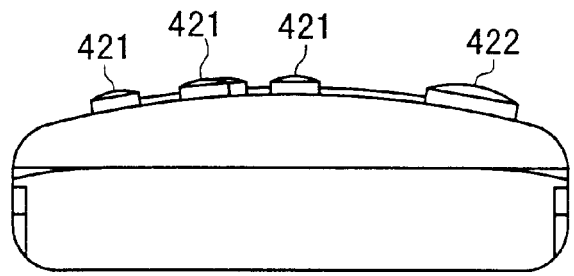
FIG. 23 is a bottom view of the portable electronic device shown in FIG. 21.

As shown in FIGS. 21 through 23, the portable electronic device 400 has a housing 401 which supports a manual control pad 420 for entering various items of information, a display unit 430 such as a liquid crystal display (LCD) unit or the like, and a window 440 for wireless communication such as infrared communication with a wireless communication command unit (not shown).

The housing 401 comprises an upper shell 401a and a lower shell 401b, and houses a board which supports memory devices, etc. thereon. The housing 401 is shaped so as to be insertable into either one of the slots 307A, 307B in the casing 302.

The window 440 is mounted on a substantially semicircular end of the housing 401. The display unit 430 occupies a substantially half area of the upper shell 401a of the housing 401, and is positioned near the window 440.

The manual control pad 420 has a plurality of control buttons 421, 422 for entering events and making various selections. The manual control pad 420 occupies the other substantially half area of the upper shell 401a, and is positioned remotely from the window 440. The manual control pad 420 is disposed on a lid 410 that is angularly movably supported on the housing 401. The control buttons 421, 422 extend through the lid 410 from its upper surface to its lower surface. The control buttons 421, 422 are supported on the lid 410 for movement into and out of the upper surface of the lid 410.

The portable electronic device 400 has a board disposed in the housing 410 and facing the lid 410 as it is closed over the housing 401. The board supports a plurality of switch pressers held in alignment with the respective control buttons 421, 422 when the lid 410 is closed over the housing 401. When one of the control buttons 421, 422 is pressed by the user, it actuates the corresponding switch presser to press a pressure switch such as a diaphragm switch, for example.

As shown in FIG. 20, the portable electronic device 400 with the lid 410 being open is inserted into the slot 307A in the casing 302 of the video game apparatus 301.

The video game apparatus 301 and the portable electronic device 400 have respective appearances and structures as described above.

Figure 24:
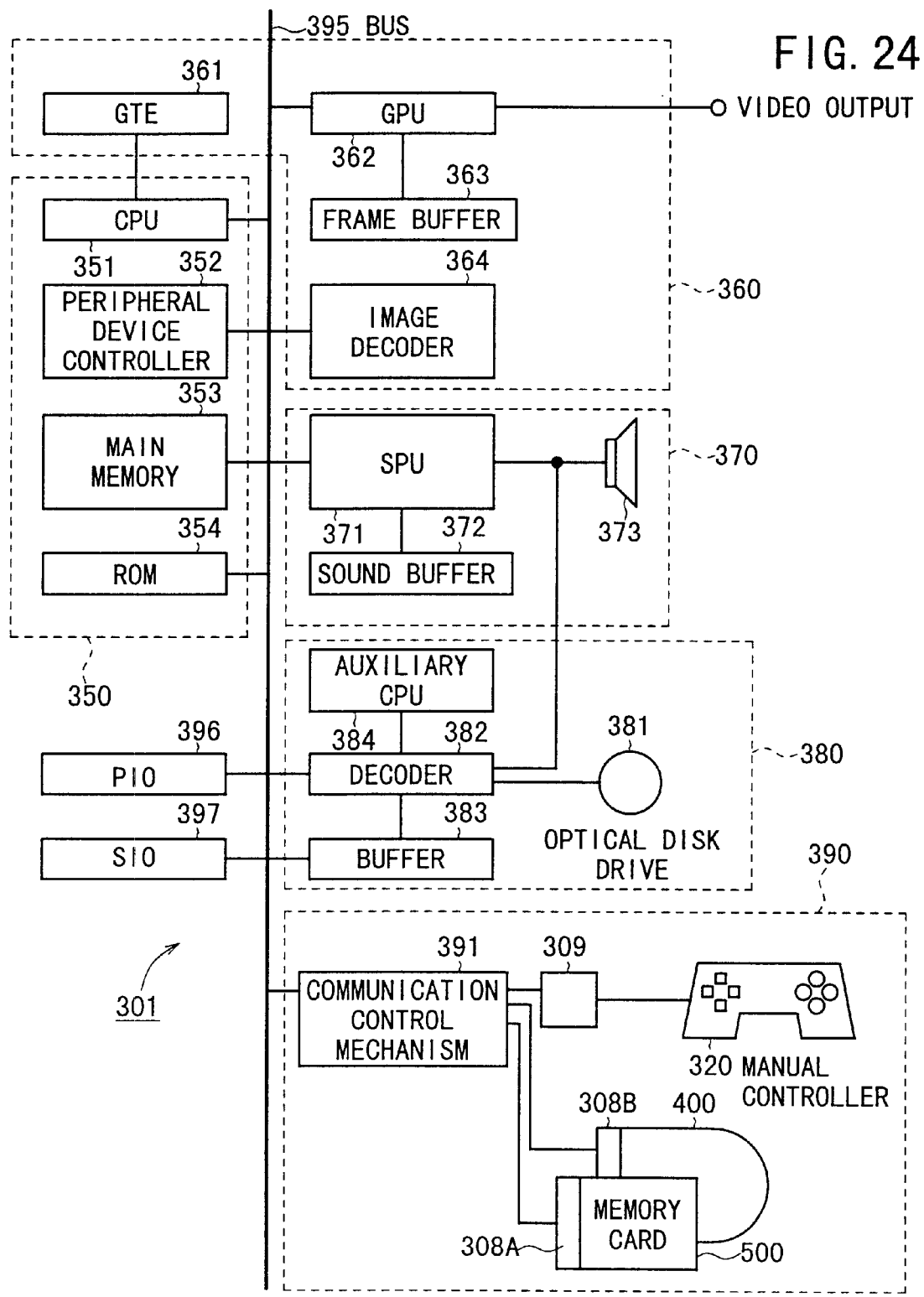
FIG. 24 is a block diagram of a video game apparatus as a specific example of the video game machine.
Figure 25:
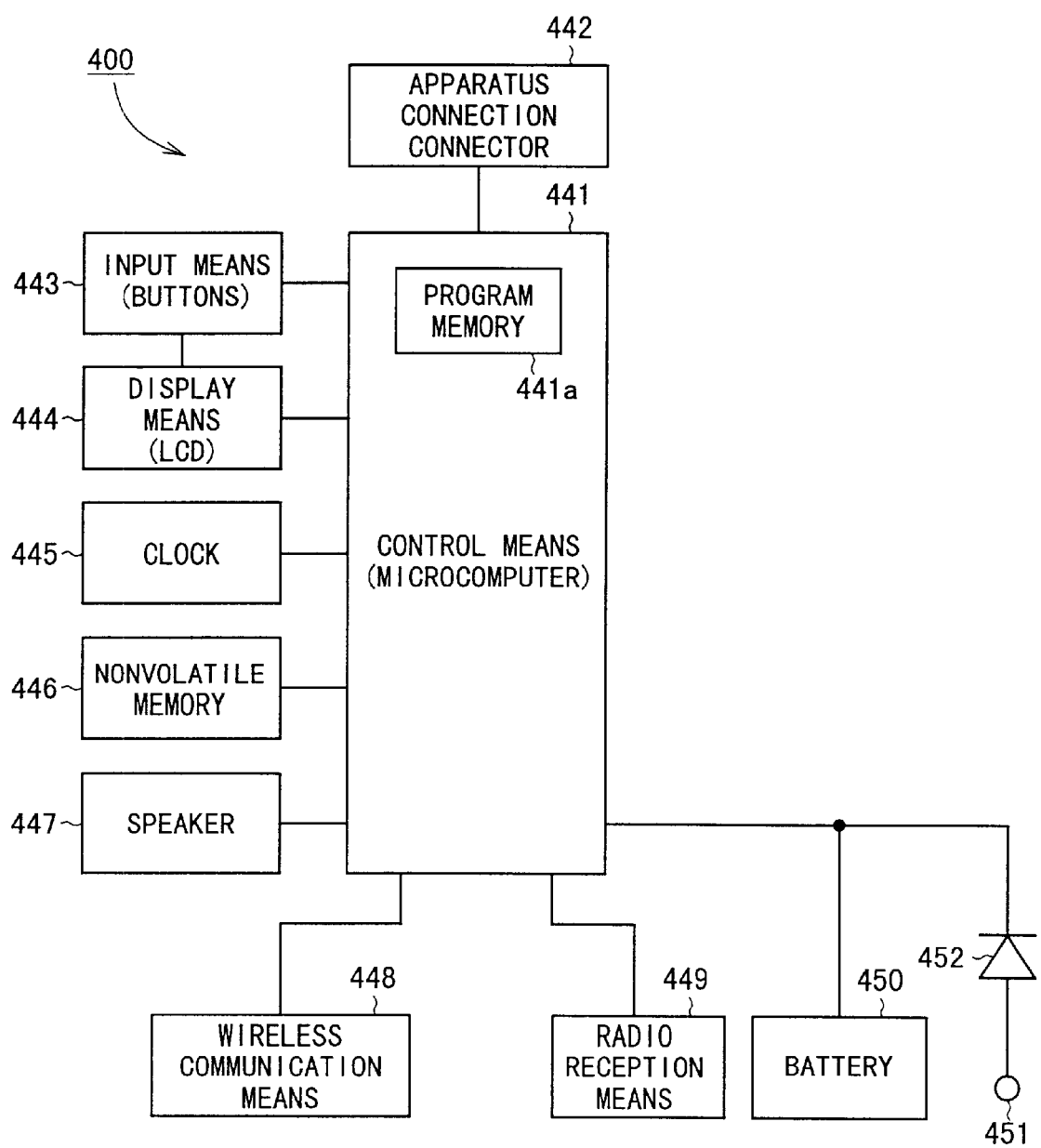
FIG. 25 is a block diagram of the portable electronic device shown in FIGS. 21 through 23.

FIGS. 24 and 25 show circuit arrangements of the video game apparatus 301 and the portable electronic device 400.

As shown in FIG. 24, the video game apparatus 301 comprises a control system 350 including a central processing unit (CPU) 351 and its peripheral devices, a graphic system 360 including a graphic processing unit (GPU) 362 for plotting image data in a frame buffer 363, a sound system 370 including a sound processing unit (SPU) 371 for generating music sounds and sound effects, an optical disk controller 380 for controlling an optical disk in which application programs are recorded, a communication controller 390 for controlling signals from the manual controller 320 which enter instructions from the user, and data supplied to and from the memory card 500 which stores game settings and the portable electronic device 400, a bus 395 to which the control system 350, the graphic system 360, the sound system 370, the optical disk controller 380, and the communication controller 390 are connected, a parallel I/O interface (PIO) 396 and a serial I/O interface (SIO) 397 which interface another apparatus.

The control system 350 comprises a CPU 351, a peripheral device controller 352 for controlling direct memory access (DMA) data transfer, a main memory 353 comprising a random-access memory (RAM), and a read-only memory (ROM) 354 storing a program such as an operating system or the like for managing the main memory 353, the graphic system 360, and the sound system 370.

The CPU 351 controls the video game apparatus 301 in its entirety by executing the operating system stored in the ROM 354.

When the video game apparatus 301 is turned on, the CPU 351 executes the operating system stored in the ROM 354 to start controlling the graphic system 360, the sound system 370, etc. For example, when the operating system is executed, the CPU 351 initializes the video game apparatus 301 in its entirety for confirming its operation, and thereafter controls the optical disc controller 380 to execute an application program recorded in the optical disk. As the application program is executed, the CPU 351 controls the graphic system 360, the sound system 370, etc. depending on instructions entered from the user for thereby controlling the display of images and the generation of music sounds and sound effects.

The CPU 351 corresponds to the CPU 11 of the video game machine 2, and recovers data received by the portable electronic device 400 and sent thereto.

The graphic system 360 functions as the graphic processor 15 of the video game machine 2. The graphic system 360 comprises a geometry transfer engine (GTE) 361 for performing coordinate transformations and other processing, a GPU 362 for plotting image data according to commands from the CPU 351, a frame buffer 363 for storing image data plotted by the GPU 362, and an image decoder 364 for decoding image data compressed and encoded by an orthogonal transform such as a discrete cosine transform.

The GTE 361 has a parallel arithmetic mechanism for performing a plurality of arithmetic operations parallel to each other, and can perform coordinate transformations, light source calculations, matrixes, or vectors at a high speed in response to a request from the CPU 351. Specifically, the GTE 361 can calculate the coordinates of a maximum of 1.5 million polygons per second for a flat shading process to plotting one triangular polygon with one color, for example. With the GTE 361, the video game apparatus 301 is able to reduce the burden on the CPU 351 and perform high-speed coordinate calculations.

According to an image plotting command from the CPU 351, the GPU 362 plots a polygon or the like in the frame buffer 363. The GPU 362 is capable of plotting a maximum of 360 thousand polygons per second.

The frame buffer 363 comprises a dual-port RAM, and is capable of simultaneously storing image data plotted by the GPU 362 or image data transferred from the main memory 353, and reading image data for display. The frame buffer 363 has a storage capacity of 1 Mbytes, for example, and is handled as a 16-bit matrix made up of a horizontal row of 1024 pixels and a vertical column of 512 pixels.

The frame buffer 363 has a display area for storing image data to be outputted as video output data, a CLUT (color look-up table) area for storing a color look-up table which will be referred to by the GPU 362 when it plots a polygon or the like, and a texture area for storing texture data to be subjected to coordinate transformations when a polygon is plotted and mapped onto a polygon plotted by the GPU 362. The CLUT area and the texture area are dynamically varied as the display area is varied.

The image decoder 364 is controlled by the CPU 351 to decode image data of a still or moving image stored in the main memory 353, and store the decoded image into the main memory 353. Image data reproduced by the image decoder 364 is transferred to the frame buffer 363 by the GPU 362, and can be used as a background for an image plotted by the GPU 362.

The sound system 370 comprises an SPU 371 for generating music sounds, sound effects, etc. based on commands from the CPU 351, a sound buffer 372 for storing waveform data from the SPU 371, and a speaker 373 for outputting music sounds, sound effects, etc. generated by the SPU 371.

The SPU 371 has an ADPCM (adaptive differential PCM) function for reproducing 16-bit sound data which has been encoded as 4-bit differential sound data by ADPCM, a reproducing function for reproducing the waveform data stored in the sound buffer 372 to generate sound effects, etc., and a modulating function for modulating and reproducing the waveform data stored in the sound buffer 372.

The sound system 370 can be used as a sampling sound source which generates music sounds, sound effects, etc. based on the waveform data stored in the sound buffer 372 according to commands from the CPU 351.

The optical disk controller 380 comprises an optical disk drive 381 for reproducing application programs and data recorded on an optical disk such as a CD-ROM or the like, a decoder 382 for decoding programs and data that are recorded with an error correcting code (ECC) added thereto, and a buffer 383 for temporarily storing data read from the optical disk drive 381 so as to allow the data from the optical disk to be read at a high speed. An auxiliary CPU 384 is connected to the decoder 382.

Sound data recorded on the optical disk which is read by the optical disk drive 381 includes PCM data converted from analog sound signals, in addition to the ADPCM data. The ADPCM data, which is recorded as 4-bit differential data of 16-bit digital data, is decoded by the decoder 382, supplied to the SPU 371, converted thereby into analog data, and applied to drive the speaker 373. The PCM data, which is recorded as 16-bit digital data, is decoded by the decoder 382 and then applied to drive the speaker 373.

The communication controller 390 comprises a communication control mechanism 391 for controlling communication with the CPU 351 via the bus 395, a controller connector 309 to which the manual controller 320 for entering instructions from the user is connected, and a pair of memory card insertion units 308A, 308B (see also FIG. 20) for receiving the memory card 300 as an auxiliary memory device for storing game settings, etc. and the portable electronic device 400, the memory card insertion units 308A, 308B being controlled by the communication control mechanism 391.

The video game apparatus 301 of the above construction can have the same functions as the video game machine 2.

Specifically, the video game apparatus 301 sends the communication application 50 and the radio communication driver 70 for the portable electronic device 400, which are recorded in the recording medium or the like, to the portable electronic device 400 via the communication control mechanism 391. The video game apparatus 301 stores received data transmitted from the portable electronic device 400 via the communication control mechanism 391 into the main memory 353. The video game apparatus 301 processes the received data and sends the processed data to the portable electronic device 400.

As shown in FIG. 25, the portable electronic device 400 comprises a control means 441, a apparatus connection connector 442, an input means 443, a display means 444, a clock function unit 445, a nonvolatile memory 446, a speaker 447, a wireless communication means 448 and a radio reception means 449 as a data transmitting/receiving means, a battery 450, and a power supply terminal 451 and a diode 452 as a power supply means.

The control means 441 comprises a microcomputer, for example. The control means 441 functions as the CPU 45 of the portable computer 3, for example. The control means 441 has a program memory 441a disposed therein as a program storage means.

The apparatus connection connector 442 serves as a connection means for connecting to a slot of another information-handling apparatus or the like.

The input means 443 serves as the input block 46 of the portable computer 3. The input means 443 comprises control buttons for controlling a program stored in the program memory 441a.

The display means 444 serves as the display block 47 of the portable computer 3. The display means 444 comprises a liquid crystal display unit or the like for displaying various items of information.

The clock function unit 445 is arranged to display time on the display means 444, for example.

The nonvolatile memory 446 serves to store various data. For example, the nonvolatile memory 446 comprises a semiconductor memory such as a flash memory which is capable of retaining stored data even when the portable electronic device 400 is turned off.

Since the portable electronic device 400 has the battery 450, the nonvolatile memory 446 may comprise a static random-access memory (SRAM) capable of storing and reading data at a high speed.

The nonvolatile memory 446 corresponds to the nonvolatile memory 42 of the portable computer 3. the nonvolatile memory 446 stores the communication application 50 and the radio communication driver 70, supplied from the recording medium or the like in the video game apparatus 301, which are required for the portable electronic device 400 to effect radio communications with the external device 4 with the radio function, and also stores data received by the portable electronic device 400.

The portable electronic device 400 can have a memory (not shown) corresponding to the working memory 43 of the portable computer 3, for storing the communication application 50, the radio communication driver 70, and received data.

The battery 450 also allows the portable electronic device 400 to be operable independently even when the portable electronic device 400 is removed from the slots 307A, 307B in the casing 302 of the video game apparatus 301.

The battery 450 comprises a chargeable secondary battery. When the portable electronic device 400 is inserted in either one of the slots 307A, 307B in the casing 302 of the video game apparatus 301, the battery 450 is supplied with electric energy from the video game apparatus 301. Specifically, the battery 450 has a terminal connected to the power supply terminal 451 via a reverse-current prevention diode 452. When the portable electronic device 400 is connected to the casing 302, electric energy is supplied from the power supply terminal 451 via the reverse-current prevention diode 452 to the battery 450.

The wireless communication means 448 has the radio communication block 41 of the portable computer 3, and is arranged to perform data communications with another memory card or the like through an infrared radiation or the like. The wireless communication means 448 is also arranged to receive various data sent from another memory card or the like.

The radio reception means 449 is arranged to receive various data transmitted by a radio broadcast.

The speaker 447 is constructed as a sound generating means for generating sounds according to a program.

The above components or means of the portable electronic device 400 are connected to the control means 441, and are operated under the control of the control means 441.

FIG. 26 shows control items of the control means 441.

As shown in FIG. 26, the control means 441 has an apparatus connection interface for connection to an information handling apparatus, a memory interface for outputting data to and inputting data from a memory, a display interface, a control input interface, a sound interface, wireless communication interface, a clock management interface, and a program download interface.

The portable electronic device 400, which has the input means 443 such as button switches for controlling a program to be executed and the display means 444 such as a liquid crystal display (LCD) unit, in addition to the functions of the portable computer 3, also serves as a portable game device when a game application is executed.

The portable electronic device 400 has a function to download an application program from the video game apparatus 301 and store the downloaded application program into the program memory 441a in the microcomputer 441. With such a function, it is possible to easily change application programs and various driver software that operate on the portable electronic device 400.

The portable electronic device 400 thus constructed can have the same functions as the portable computer 3.

Specifically, the portable electronic device 400 stores the communication application 50 and the radio communication driver 70 supplied from the video game apparatus 301 into the nonvolatile memory 446 or a non-illustrated memory, so that the portable electronic device 400 can perform radio communications with the external device 4 with the radio function. Thereafter, the portable electronic device 400 receives data sent from the external device 4 with the radio function via the wireless communication means 448, and stores the received data into the nonvolatile memory 446 or the non-illustrated memory. The stored data are sent via the apparatus connection connector 442 to the video game apparatus 301. The portable electronic device 400 also receives data from the video game apparatus 301, and stores the received data into the nonvolatile memory 446 or the non-illustrated memory. The stored data are set via the wireless communication means 448 to the external device 4 with the radio function.

The above video entertainment system is a specific example of the video game machine 2 and the portable computer 3.

Therefore, the data processing system 1 comprising the video game machine 2 and the portable computer 3 is capable of sending data to and receiving data from the external device 4 with the radio function, and also functions as the video entertainment system.

The external device 4 with the radio function may be any device insofar as it has a radio communications function. For example, the external device 4 with the radio function may be a digital camera, a notebook-sized personal computer, a desktop personal computer, a portable telephone set, or the like. Data sent from the device 4 with the radio function to the video game machine 2 may be image data, for example. Since the video game apparatus 301 is a very high capability to process image data, the data processing system can edit images at high speed. Using the real-time data processing ability of the video game apparatus 301, the data processing system is capable of processing data in response to a control input action entered by the user.

As described in detail above, a system for processing data according to the present invention has a master unit for processing data and a slave unit removably connected to the master unit and having a communication means. A communication means control program, which the master unit has acquired with a data supply means, for enabling radio communications between the slave unit and an external device having a radio communication function is supplied from the master unit to the slave unit by the data supply means, and the slave unit stores the supplied communication means control program into a memory means.

When the communication means control program supplied the master unit to the slave unit is run by the slave unit, data can be sent and received between the master unit and the slave unit via radio communications. By replacing the slave unit for each different external device, the master unit can perform radio communications with a variety of external devices.

Accordingly, the system for processing data allows data to be sent and received between the master unit and the external device via the slave unit.

In the system for processing data, furthermore, since the communication means control program is supplied from the master unit to the slave unit, the communication means control program does not need to be resident in the slave unit, and hence computational resources of the slave unit can effectively be utilized.

In the system for processing data, the master unit has a processing means for processing input data. Data which the slave unit has received from the external device are supplied as input data to the master unit, and the input data are processed by the processing means to produce processed data. The processed data are then sent from the master unit to the external device according to the communication means control program of the slave unit.

Consequently, the system for processing data according to the present invention can process data at high speed in a real-time fashion based on the data processing capability of the master unit.

For example, image data from a digital camera or a personal computer which serves as the device 4 with the radio function that is the external device are sent via the portable computer 3 to the video game machine 2 as the master unit which has a very high image data processing capability. The image data are processed by the video game machine 2. The processed image data are sent via the portable computer 3 back to the digital camera or the personal computer as the device 4 with the radio function. Therefore, images based on the processed image data can be viewed on the digital camera or the personal computer.

In a method of processing data according to the present invention, a slave unit having a memory means is removably connected to a master unit for processing data, and a communication means control program, which the master unit has acquired, for enabling radio communications between the slave unit and an external device having a radio communication function is supplied to and stored in the slave unit. Then, the slave unit and the external device send and receive data therebetween via a communication means.

In the method of processing data, the communication means control program is supplied from the master unit to the slave unit, and run by the slave unit for allowing data to be sent and received between the master unit and the external device via the slave unit.

An apparatus for sending and receiving data according to the present invention has a communication means for sending data to and receiving data from an external device having a radio communication function, and a memory means for storing inputted data, and is supplied with a communication means control program for performing radio communications with the external device from a data processing apparatus.

Since the apparatus for sending and receiving data is supplied with the communication means control program from the data processing apparatus, the data sending and receiving apparatus can perform radio communications with the external device.

In a method of sending and receiving data according to the present invention, radio communications with an external device having a radio communication function are performed according to a communication means control program supplied from a data processing apparatus, data received from the external device are transferred to the data processing apparatus, and processed data inputted from the data processing apparatus are sent to the external device.

Because radio communications with the external device can be performed according to the communication means control program supplied from the data processing apparatus for allowing communications with the data processing apparatus, data can be sent and received between the data processing apparatus and the external device.

Although certain preferred embodiments of the present invention have been shown and described in detail, it should be understood that various changes and modifications may be made therein without departing from the scope of the appended claims.

What is claimed is:

1. A system for processing data, comprising:
a master unit for processing data; and
a slave unit removably connected to said master unit;
said slave unit comprising:
communication means for sending data to and receiving data from an external device having a wireless communication function; and
memory means for storing inputted data;
said master unit comprising:
data supply means for acquiring and supplying data including a communication means control program for enabling wireless communications with said slave unit and said external device;
the arrangement being such that said data supply means supplies said communication means control program to said slave unit, and said slave unit stores said communication means control program supplied from said master unit into said memory means.

2. A system according to claim 1, wherein said data supply means comprises means for reading said communication means control program from a recording medium removably loaded in said master unit and outputting said communication means control program to said slave unit.

3. A system according to claim 1, wherein said slave unit and said external device have means for performing wireless communications therebetween by way of infrared rays.

4. A system according to claim 1, wherein said slave unit comprises means for receiving data sent from said external device to said slave unit via said communication means, and transferring the received data to said master unit.

5. A system according to claim 1, wherein said slave unit comprises means for being supplied with data processed by said master unit and sending the processed data to said external device via said communication means.

6. A system according to claim 1, wherein said master unit comprises processing means for processing input data supplied from said slave unit to said master unit, the arrangement being such that said master unit is supplied with data which said slave unit has received from said external device as said input data, said processing means processes said input data to produce processed data, and said slave unit is supplied with the processed data from said master unit and sends the processed data as transmitted data to said external device via said communication means.

7. A system according to claim 6, wherein said master unit has manual control input means for an operator to enter a control input, said processing means being operable to process data in response to said control input entered through said manual control input means.

8. A system according to claim 1, comprising a plurality of said slave units removably connected to said master unit, wherein said master unit is supplied with input data from several of said slave units and outputs processed data to other slave units than said several of said slave units.

9. A system according to claim 1, comprising a plurality of said external devices connected to said slave unit by said communication means, wherein said slave unit receives data sent from several of said external devices and sends the received data to other external devices than said several of said external devices.

10. A system according to claim 1, wherein said master unit comprises a video game machine, and said slave unit comprises a portable information communication terminal.

11. A system according to claim 1, wherein said master unit comprises a video game machine, said slave unit comprises a portable information communication terminal, and said external device comprises a digital camera or a personal computer.

12. A method of processing data with a master unit for processing data and a slave unit removably connected to said master unit and having memory means and communication means, comprising the steps of:

supplying a communication means control program, which said master unit has acquired, for enabling wireless communications between said slave unit and an external device having a wireless communication function to said slave unit;

storing said communication means control program into said memory means of said salve unit; and sending and receiving data between said slave unit and said external device via said communication means.

13. An apparatus for sending and receiving data, comprising:

communication means for sending data to and receiving data from an external device having a wireless communication function; and memory means for storing inputted data;

wherein said apparatus is supplied with a communication means control program for performing wireless communications with the external device from a data processing apparatus.

14. An apparatus according to claim 13, for performing wireless communications with said external device by way of infrared rays.

15. An apparatus according to claim 13, for receiving data from said external device via said communication means and transferring the received data to said data processing apparatus.

16. An apparatus according to claim 13, for being supplied with processed data outputted from said data processing apparatus and sending the processed data to said external device via said communication means.

17. An apparatus according to claim 13, wherein said apparatus comprises a portable information communication terminal, and said data processing apparatus comprises a video game machine.

18. An apparatus according to claim 13, wherein said apparatus comprises a portable information communication terminal, said data processing apparatus comprises a video game machine, and said external device comprises a digital camera or a personal computer.

19. A method of sending and receiving data, comprising the steps of:

performing wireless communications from a data sending and receiving apparatus with an external device having a wireless communication function according to a communication means control program supplied from a data processing apparatus;

transferring data received from the external device from said data sending and receiving apparatus to said data processing apparatus; and sending processed data inputted from said data processing apparatus from said data sending and receiving apparatus to said external device.

* * * * *

UNITED STATES PATENT AND TRADEMARK OFFICE
CERTIFICATE OF CORRECTION

PATENT NO. : 6,567,845 B1
DATED : May 20, 2003
INVENTOR(S) : Masayuki Chatani

It is certified that error appears in the above-identified patent and that said Letters Patent is hereby corrected as shown below:

<u>Title page,</u>
Item [73], Assignee, change "Sony Computer Entertainment, Inc., Tokyo, (JP)" to
-- Sony Computer Entertainment Inc., Tokyo, (JP) --

Signed and Sealed this

Eighth Day of July, 2003

JAMES E. ROGAN
*Director of the United States Patent and Trademark Office*